US012666484B2

(12) United States Patent
Zhang

(10) Patent No.: US 12,666,484 B2
(45) Date of Patent: Jun. 23, 2026

(54) COMMUNICATION METHOD AND COMMUNICATIONS APPARATUS

(71) Applicant: HUAWEI TECHNOLOGIES CO., LTD., Shenzhen (CN)

(72) Inventor: Di Zhang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 625 days.

(21) Appl. No.: 17/382,783

(22) Filed: Jul. 22, 2021

(65) Prior Publication Data

US 2021/0352753 A1 Nov. 11, 2021

Related U.S. Application Data

(63) Continuation of application No. PCT/CN2020/073670, filed on Jan. 22, 2020.

(30) Foreign Application Priority Data

Jan. 23, 2019 (CN) .......................... 201910064872.7

(51) Int. Cl.
*H04W 76/19* (2018.01)
*H04L 1/00* (2006.01)
(Continued)

(52) U.S. Cl.
CPC ........... *H04W 76/19* (2018.02); *H04L 1/0004* (2013.01); *H04W 72/0466* (2013.01); *H04W 72/23* (2023.01)

(58) Field of Classification Search
CPC . H04W 76/19; H04W 72/0466; H04W 72/23; H04W 40/248; H04W 40/34;
(Continued)

(56) References Cited

U.S. PATENT DOCUMENTS

2012/0122440 A1 5/2012 Krishnamurthy et al.
2013/0051214 A1 2/2013 Fong et al.
(Continued)

FOREIGN PATENT DOCUMENTS

CN 103379529 A 10/2013
CN 103581941 A 2/2014
(Continued)

OTHER PUBLICATIONS

3GPP TS 38.212 V15.4.0 (Dec. 2018), "3rd Generation Partnership Project; Technical Specification Group Radio Access Network;NR;Multiplexing and channel coding(Release 15)," Dec. 2018, 100 pages.
(Continued)

*Primary Examiner* — Omer S Mian
(74) *Attorney, Agent, or Firm* — Fish & Richardson P.C.

(57) ABSTRACT

This application provides example communication methods and example communications apparatuses. One example communication method includes sending first information on a first resource, where the first information is used to indicate a link failure. Second information can then be received, where the second information is used to indicate a second resource. Third information can then be sent on the second resource based on the second information, where the third information is used to indicate at least one of a first reference signal or a first cell, and where when channel quality of the first reference signal is greater than or equal to a preset threshold, the link failure occurs in the first cell.

19 Claims, 5 Drawing Sheets

(51) Int. Cl.
  *H04W 72/044*  (2023.01)
  *H04W 72/23*  (2023.01)

(58) Field of Classification Search
  CPC .... H04W 76/18; H04L 1/0004; H04L 5/0023;
  H04L 1/1812
  See application file for complete search history.

(56) References Cited

U.S. PATENT DOCUMENTS

| | | | | |
|---|---|---|---|---|
| 2013/0210435 | A1 | 8/2013 | Dimou et al. | |
| 2014/0161088 | A1* | 6/2014 | Seo | H04L 5/0053 |
| | | | | 370/329 |
| 2016/0128134 | A1 | 5/2016 | Yiu et al. | |
| 2017/0041112 | A1 | 2/2017 | Kim et al. | |
| 2018/0270698 | A1 | 9/2018 | Babaei et al. | |
| 2018/0279318 | A1* | 9/2018 | Wang | H04W 72/046 |
| 2019/0045566 | A1* | 2/2019 | Wu | H04W 74/0833 |
| 2019/0058517 | A1* | 2/2019 | Kang | H04L 5/005 |
| 2019/0081691 | A1* | 3/2019 | Nagaraja | H04W 36/305 |
| 2019/0190582 | A1* | 6/2019 | Guo | H04L 1/0061 |
| 2020/0059285 | A1* | 2/2020 | Zhang | H04W 74/0833 |
| 2020/0154309 | A1* | 5/2020 | Takeda | H04L 1/1614 |
| 2020/0344834 | A1* | 10/2020 | Harada | H04B 7/088 |
| 2022/0322480 | A1* | 10/2022 | Deenoo | H04W 72/23 |

FOREIGN PATENT DOCUMENTS

| | | |
|---|---|---|
| CN | 103582164 A | 2/2014 |
| CN | 104219787 A | 12/2014 |
| CN | 107438266 A | 12/2017 |
| CN | 108631889 A | 10/2018 |
| CN | 108663025 A | 10/2018 |
| CN | 108712786 A | 10/2018 |
| CN | 108810928 A | 11/2018 |
| CN | 108848523 A | 11/2018 |
| CN | 109039408 A | 12/2018 |
| CN | 109076365 A | 12/2018 |
| CN | 109151869 A | 1/2019 |
| CN | 109219972 A | 1/2019 |
| EP | 2481249 A1 | 8/2012 |
| EP | 2815604 A1 | 12/2014 |
| WO | 2013121372 A1 | 8/2013 |
| WO | 2018170481 A1 | 9/2018 |

OTHER PUBLICATIONS

3GPP TS 38.213 V15.4.0 (Dec. 2018), "3rd Generation Partnership Project; Technical Specification Group Radio Access Network; NR;Physical layer procedures for control(Release 15)," Dec. 2018, 104 pages.

3GPP TS 38.321 V15.4.0 (Dec. 2018), "3rd Generation Partnership Project; Technical Specification Group Radio Access Network; NR; Medium Access Control (MAC) protocol specification (Release 15)," Dec. 2018, 77 pages.

3GPP TS 38.331 V15.4.0 (Dec. 2018), "3rd Generation Partnership Project; Technical Specification Group Radio Access Network;NR-;Radio Resource Control (RRC) protocol specification(Release 15)," Dec. 2018, 474 pages.

Office Action issued in Chinese Application No. 201910064872.7 on Aug. 23, 2021, 27 pages (with English translation).

PCT International Search Report and Written Opinion issued in International Application No. PCT/CN2020/073670 on Apr. 22, 2020, 17 pages (with English translation).

Samsung, "Remaining Issues on Beam Management," 3GPP TSG RAN WG1 Meeting #94bis, R1-1810839, Chengdu, China, Oct. 8-12, 2018, 6 pages.

Extended European Search Report issued in European Application No. 20744677.4 on Feb. 11, 2022, 9 pages.

Huawei, HiSilicon, "CR on TS38.133 for link recovery procedure requirements," 3GPP TSG-RAN WG4 Meeting #AH-1807, R4-1809327, Montreal, Canada, Jul. 2-6, 2018, 8 pages.

Office Action issued in Chinese Application No. 201910064872.7 on Jun. 8, 2022, 7 pages (with English translation).

* cited by examiner

Communications
system 100

Communications system 200

COMMUNICATION METHOD AND COMMUNICATIONS APPARATUS

CROSS-REFERENCE TO RELATED APPLICATIONS

This application is a continuation of International Application No. PCT/CN2020/073670, filed on Jan. 22, 2020, which claims priority to Chinese Patent Application No. 201910064872.7, filed on Jan. 23, 2019. The disclosures of the aforementioned applications are hereby incorporated by reference in their entireties.

TECHNICAL FIELD

This application relates to the communications field, and in particular, to a communication method and a communications apparatus.

BACKGROUND

With emergence of intelligent terminals, especially emergence of video services, current spectrum resources can hardly match an explosive growth of user requirements on a capacity. In view of this, a communication manner of multi-beam (multi-beam) transmission is introduced into a 5th generation (5th generation, 5G) mobile communications system, to improve a system capacity and system coverage, and improve user experience.

In multi-beam transmission, a network device obtains, through beam training, N beam pair links (beam pair link, BPL) that have desirable communication quality with user equipment (user equipment, UE). In a subsequent communication process, the network device performs data transmission with the UE by using the N BPLs. However, an obstacle exists in a communication process, and consequently, a current serving beam is blocked, a link failure occurs, and a signal cannot continue to be transmitted. After determining that a link fails, the UE recovers the failed link.

When recovering the link, the UE sends a scheduling request (scheduling request, SR) to the network device, to request the network device to configure an uplink resource. After receiving the SR, the network device schedules the uplink resource by using downlink control information (downlink control information, DCI). The UE reports a buffer status report (buffer status reporting, BSR) by using the uplink resource. The BSR is used to indicate a quantity of pieces of uplink data that the UE needs to send. Then, the network device allocates a physical uplink shared channel (physical uplink shared channel, PUSCH) resource of a corresponding size to the UE based on the BSR. Correspondingly, the UE sends a newly identified downlink on the uplink resource allocated by the network device. In this case, if the UE receives link failure recovery response information from the network device, link recovery succeeds.

The foregoing process of recovering a link between network device and the UE takes an excessively long time.

SUMMARY

This application provides a communication method and a communications apparatus, to reduce a link recovery delay.

According to a first aspect, a communication method is provided. The communication method includes: sending first information on a first resource, where the first information is used to indicate a link failure; receiving second information, where the second information is used to indicate a second resource; and sending third information on the second resource based on the second information, where the third information is used to indicate a first reference signal and/or a first cell, and when channel quality of the first reference signal is greater than or equal to a preset threshold, the link failure occurs in the first cell.

In the communication method in this embodiment of this application, the terminal device may directly send the third information on the second resource based on an indication of the second information, to initiate link recovery to the network device, and does not need to report a BSR to the network device. This can reduce a link recovery delay.

In some possible implementations, the second resource is a preconfigured resource and/or the second resource is a resource carrying a fixed quantity of bits.

In the communication method in this embodiment of this application, after sending the first information, the terminal device may directly send the third information on the second resource that is preconfigured and/or that carries the fixed quantity of bits, and does not need to report the BSR to the network device. This can reduce the link recovery delay.

In some possible implementations, the second information is one of the following: downlink control information DCI in a dedicated search space, DCI scrambled by using a dedicated radio network temporary identifier RNTI, or DCI including a preset state value.

In the communication method in this embodiment of this application, the second information is the downlink control information DCI in the dedicated search space, the DCI scrambled by using the dedicated RNTI, or the DCI including the preset state value. After receiving the information, the terminal device may determine that the information is response information of the link failure or response information of the first information. This can ensure reliability of link failure recovery.

Particularly, when the terminal device sends a plurality of pieces of SR information, some pieces of SR information are SR information used for a normal uplink data scheduling request, and some other pieces of SR information are first information used to request the link failure recovery or first information used to indicate the link failure. After the plurality of pieces of SR information are sent, the terminal device cannot distinguish a specific piece of SR information to which DCI or an uplink grant (UL grant) sent by the network device is responded, and the terminal device cannot determine whether the network device receives the first information. For example, the terminal device determines that a link failure occurs in a secondary cell/secondary serving cell (secondary cell/secondary serving cell, SCell), and sends the first information to the network device. In addition, because a primary cell/primary serving cell (primary cell/primary serving cell, PCell) has uplink data to send, the terminal device further sends an SR, where the SR is used to request to send the uplink data. The terminal device cannot distinguish whether DCI or a UL grant sent by the network device later is a response to the first information or a response to the SR information. However, in this application, the network device sends the second information after receiving the first information, where the second information is the downlink control information DCI in the dedicated search space, the DCI scrambled by using the dedicated RNTI, or the DCI including the preset state value, and the terminal device may determine that the second information is the response information of the first information. This avoids a case in which the terminal device cannot distinguish whether the DCI or the UL grant sent by the network device is a response to the first information or a response to SR information of the normal uplink data scheduling request. This can ensure the reliability of link failure recovery.

In some possible implementations, the method further includes: detecting fourth information in a first time period based on the third information, where the fourth information indicates link failure recovery response information, and a start moment of the first time period is after a sending moment of the third information.

In some possible implementations, the fourth information is one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

In the communication method in this embodiment of this application, the fourth information is one of the foregoing information. After receiving the foregoing information, the terminal device may determine that the information is response information of the third information. This can ensure the reliability of link failure recovery.

Optionally, when the fourth information is the QCL indication information, the network device may send the fourth information to the terminal device by using a resource in a second cell, or when the fourth information is the DCI scrambled by using the C-RNTI, the DCI scrambled by using the MCS-C-RNTI, the DCI in the dedicated search space, the DCI scrambled by using the dedicated RNTI, the DCI scrambled by using the RA-RNTI, the DCI including the preset state value, the DCI including the transmission configuration indicator TCI information, or the DCI in the preset format, the network device may send the fourth information to the terminal device by using a resource in the first cell, where the second cell is a cell different from the first cell.

Optionally, the fourth information is sent based on a reference signal in the third information or fifth information. For example, the fourth information and the reference signal indicated in the third information or the fifth information meet a QCL relationship. This may also be understood as that the terminal device receives the fourth information by using a spatial correlation parameter corresponding to the reference signal indicated in the third information or the fifth information. The terminal device may determine, by receiving the fourth information, that the reference signal indicated in the third information or the fifth information is available, thereby ensuring the reliability of link failure recovery. That is, the terminal device determines that the newly identified downlink (the reference signal indicated in the third information or the fifth information) is available, thereby ensuring reliable transmission of the link.

In some possible implementations, the method further includes: when the fourth information is not detected in the first time period, sending fifth information on the second resource, where the fifth information indicates a second reference signal and/or the first cell, and channel quality of the second reference signal is greater than or equal to the preset threshold.

In the communication method in this embodiment of this application, when the fourth information is not detected in the first time period, the terminal device resends the fifth information on the second resource, and does not need to re-apply for a resource from the network device. This can reduce a link failure recovery delay.

In some possible implementations, the method further includes: when the fourth information is detected in the first time period, sending sixth information, where the sixth information indicates that link recovery succeeds.

In the communication method in this embodiment of this application, after receiving the sixth information, the network device may determine that link recovery succeeds, and may release a resource in time. This can reduce resource overheads.

In some possible implementations, the third information and/or the fifth information is link failure recovery request information, and the method further includes: continuing to send one or more pieces of the link failure recovery request information; and when a quantity of times of sending the link failure recovery request information reaches a preset quantity of times, determining that link recovery fails.

In some possible implementations, the method further includes: when the fourth information is not detected in the first time period, sending the first information on the first resource, where the first information is used to indicate the link failure.

In the communication method in this embodiment of this application, the terminal device resends the first information when the terminal device does not receive the fourth information. This can ensure the reliability of link failure recovery.

In some possible implementations, the method further includes: when a quantity of times of sending the first information reaches a preset quantity of times, determining that link recovery fails.

In some possible implementations, the method further includes: when the fourth information is not detected in a second time period, determining that link recovery fails, where a start moment of the second time period is after the sending moment of the third information, and duration of the second time period is greater than duration of the first time period.

In some possible implementations, the second resource is a semi-persistent resource.

In the communication method in this embodiment of this application, when the fourth information is not detected in the first time period, the terminal device resends the fifth information on the second resource, and does not need to re-apply for the second resource from the network device. This can reduce the link recovery delay.

In some possible implementations, the method further includes: when the fourth information is detected or when the sixth information is sent, deactivating the second resource; or when determining that link recovery fails, deactivating the second resource.

In the communication method in this embodiment of this application, when link recovery succeeds or link recovery fails, the terminal device releases the second resource in time. This can effectively reduce system resource overheads.

In some possible implementations, the first resource is a physical random access channel PRACH resource or a physical uplink control channel PUCCH resource.

In some possible implementations, the second resource is a PRACH resource or a physical uplink shared channel PUSCH resource.

According to a second aspect, a communication method is provided. The communication method includes: receiving first information on a first resource, where the first information is used to indicate a link failure; sending second information, where the second information is used to indicate a second resource; and receiving third information on the second resource based on the second information, where the third information is used to indicate a first reference signal and/or a first cell, and when channel quality of the first reference signal is greater than or equal to a preset threshold, the link failure occurs in the first cell.

In the communication method in this embodiment of this application, the network device sends the second information, where the second information is used to indicate the second resource; and subsequently, the terminal device may directly send the third information on the second resource based on the second information, and does not need to report a BSR to the network device. This can reduce a link recovery delay.

In some possible implementations, the second resource is a preconfigured resource and/or the second resource is a resource carrying a fixed quantity of bits.

In the communication method in this embodiment of this application, after sending the first information, the terminal device may directly send the third information on the second resource that is preconfigured and/or that carries the fixed quantity of bits, and does not need to report the BSR to the network device. This can reduce the link recovery delay.

In some possible implementations, the second information is one of the following: downlink control information DCI in a dedicated search space, DCI scrambled by using a dedicated RNTI, or DCI including a preset state value.

In the communication method in this embodiment of this application, the second information is the downlink control information DCI in the dedicated search space, the DCI scrambled by using the dedicated RNTI, or the DCI including the preset state value. The network device sends the information to the terminal device, and the terminal device may determine that the information is response information of the link failure or response information of the first information. This can ensure reliability of link failure recovery.

In some possible implementations, the method further includes: sending fourth information, where the fourth information indicates link failure recovery response information.

In some possible implementations, the fourth information is one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

In the communication method in this embodiment of this application, the fourth information is one of the foregoing information. The network device sends the foregoing information to the terminal device, and the terminal device may determine that the information is response information of the third information. This can ensure the reliability of link failure recovery.

Optionally, when the fourth information is the QCL indication information, the network device may send the fourth information to the terminal device by using a resource in a second cell, or when the fourth information is the DCI scrambled by using the C-RNTI, the DCI scrambled by using the MCS-C-RNTI, the DCI in the dedicated search space, the DCI scrambled by using the dedicated RNTI, the DCI scrambled by using the RA-RNTI, the DCI including the preset state value, the DCI including the transmission configuration indicator TCI information, or the DCI in the preset format, the network device may send the fourth information to the terminal device by using a resource in the first cell, where the second cell is a cell different from the first cell.

In some possible implementations, the method further includes: receiving fifth information on the second resource, where the fifth information indicates a second reference signal and/or the first cell, and channel quality of the second reference signal is greater than or equal to the preset threshold.

In the communication method in this embodiment of this application, when the fourth information is not detected in the first time period, the terminal device resends the fifth information on the second resource, and does not need to re-apply for a resource from the network device. This can reduce a link failure recovery delay.

In some possible implementations, the method further includes: receiving sixth information, where the sixth information indicates that link recovery succeeds.

In the communication method in this embodiment of this application, after receiving the sixth information, the network device may determine that link recovery succeeds, and may release a resource in time. This can reduce resource overheads.

In some possible implementations, the third information and/or the fifth information is link failure recovery request information, and the method further includes: when the link failure recovery request information is received, continuing to send the fourth information; and when a quantity of times of sending the fourth information reaches a preset quantity of times and/or the sixth information is not received in a third time period, determining that link recovery fails, where a start moment of the third time period is after a sending moment of the fourth information.

In some possible implementations, the method further includes: receiving the first information on the first resource, where the first information is used to indicate the link failure.

In the communication method in this embodiment of this application, the terminal device resends the first information when the terminal device does not receive the fourth information, to re-initiate link recovery to the network device. This can ensure the reliability of link failure recovery.

In some possible implementations, the method further includes: when a quantity of times of receiving the first information reaches a preset quantity of times, determining that link recovery fails. It may also be understood that when the first information is detected for a maximum quantity of times, and the first information is still not received, the link failure recovery fails.

In some possible implementations, the second resource is a semi-persistent resource.

In the communication method in this embodiment of this application, when the fourth information is not detected in the first time period, the terminal device resends the fifth information on the second resource, and does not need to re-apply for the second resource from the network device. This can reduce the link recovery delay.

In some possible implementations, the method further includes: when the sixth information is received, deactivating the second resource; or when determining that link recovery fails, deactivating the second resource.

In the communication method in this embodiment of this application, when link recovery succeeds or link recovery fails, the network device releases the second resource in time. This can effectively reduce system resource overheads.

In some possible implementations, the first resource is a physical random access channel PRACH resource or a physical uplink control channel PUCCH resource.

In some possible implementations, the second resource is a PRACH resource or a physical uplink shared channel PUSCH resource.

According to a third aspect, a communications apparatus is provided. The communications apparatus includes: a sending module, configured to send first information on a first resource, where the first information is used to indicate a link failure; and a receiving module, configured to receive second information, where the second information is used to indicate a second resource, where the sending module is further configured to send third information on the second resource based on the second information, where the third information is used to indicate a first reference signal and/or a first cell, and when channel quality of the first reference signal is greater than or equal to a preset threshold, the link failure occurs in the first cell.

In the communications apparatus in this embodiment of this application, the communications apparatus receives the second information, where the second information is used to indicate the second resource; and subsequently, the communications apparatus may directly send the third information on the second resource based on the second information, and does not need to report a BSR to the network device. This can reduce a link recovery delay.

In some possible implementations, the second resource is a preconfigured resource and/or the second resource is a resource carrying a fixed quantity of bits.

In the communications apparatus in this embodiment of this application, after sending the first information, the communications apparatus may directly send the third information on the second resource that is preconfigured and/or that carries the fixed quantity of bits, and does not need to report the BSR to the network device. This can reduce the link recovery delay.

In some possible implementations, the second information is one of the following: downlink control information DCI in a dedicated search space, DCI scrambled by using a dedicated radio network temporary identifier RNTI, or DCI including a preset state value.

In the communications apparatus in this embodiment of this application, the second information is the downlink control information DCI in the dedicated search space, the DCI scrambled by using the dedicated RNTI, or the DCI including the preset state value. After receiving the information, the communications apparatus may determine that the information is response information of the link failure or response information of the first information. This can ensure reliability of link failure recovery.

In some possible implementations, the receiving module is further configured to detect fourth information in a first time period based on the third information, where the fourth information indicates link failure recovery response information, and a start moment of the first time period is after a sending moment of the third information.

In some possible implementations, the fourth information is one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

In the communications apparatus in this embodiment of this application, the fourth information is one of the foregoing information. After receiving the foregoing information, the communications apparatus may determine that the information is response information of the third information. This can ensure the reliability of link failure recovery.

In some possible implementations, the sending module is further configured to: when the fourth information is not detected in the first time period, send fifth information on the second resource, where the fifth information indicates a second reference signal and/or the first cell, and channel quality of the second reference signal is greater than or equal to the preset threshold.

In the communications apparatus in this embodiment of this application, when the fourth information is not detected in the first time period, the communications apparatus resends the fifth information on the second resource, and does not need to re-apply for a resource from the network device. This can reduce a link failure recovery delay.

In some possible implementations, the sending module is further configured to: when the fourth information is detected in the first time period, send sixth information, where the sixth information indicates that link recovery succeeds.

In the communications apparatus in this embodiment of this application, after receiving the sixth information, the network device may determine that link recovery succeeds, and may release a resource in time. This can reduce resource overheads.

In some possible implementations, the third information and/or the fifth information is link failure recovery request information, and the sending module is further configured to continue to send one or more pieces of the link failure recovery request information; and the apparatus further includes a processing module, configured to: when a quantity of times of sending the link failure recovery request information reaches a preset quantity of times, determine that link recovery fails.

In some possible implementations, the sending module is further configured to: when the fourth information is not detected in the first time period, send the first information on the first resource, where the first information is used to indicate the link failure.

In the communications apparatus in this embodiment of this application, the communications apparatus resends the first information when the communications apparatus does not receive the fourth information. This can ensure the reliability of link failure recovery.

In some possible implementations, the processing module is further configured to: when a quantity of times of sending the first information reaches a preset quantity of times, determine that link recovery fails.

In some possible implementations, the processing module is further configured to: when the fourth information is not detected in a second time period, determine that link recovery fails, where a start moment of the second time period is after the sending moment of the third information, and duration of the second time period is greater than duration of the first time period.

In some possible implementations, the second resource is a semi-persistent resource.

In the communications apparatus in this embodiment of this application, when the fourth information is not detected in the first time period, the terminal device resends the fifth information on the second resource, and does not need to re-apply for the second resource from the network device. This can reduce the link recovery delay.

In some possible implementations, the processing module is further configured to: when the fourth information is detected or when the sixth information is sent, deactivate the second resource; or when determining that link recovery fails, deactivate the second resource.

In the communications apparatus in this embodiment of this application, when link recovery succeeds or link recovery fails, the communications apparatus releases the second resource in time. This can effectively reduce system resource overheads.

In some possible implementations, the first resource is a physical random access channel PRACH resource or a physical uplink control channel PUCCH resource.

In some possible implementations, the second resource is a PRACH resource or a physical uplink shared channel PUSCH resource.

Modules included in the apparatus in the third aspect may be implemented in a software and/or hardware manner.

For example, the modules included in the apparatus in the third aspect may be implemented by using a processor. To be specific, the apparatus in the third aspect may include a processor. The processor is configured to execute a program instruction, to implement functions that can be implemented by the modules included in the apparatus.

Optionally, the apparatus in the third aspect may further include a memory, configured to store the program instruction executed by the processor, and even configured to store various types of data.

Optionally, the apparatus in the third aspect may be a chip that can be integrated into an intelligent device. In this case, the apparatus may further include a communications interface.

According to a fourth aspect, a communications apparatus is provided. The communications apparatus includes: a receiving module, configured to receive first information on a first resource, where the first information is used to indicate a link failure; and a sending module, configured to send second information, where the second information is used to indicate a second resource, where the receiving module is further configured to receive third information on the second resource based on the second information, where the third information is used to indicate a first reference signal and/or a first cell, and when channel quality of the first reference signal is greater than or equal to a preset threshold, the link failure occurs in the first cell.

In the communications apparatus in this embodiment of this application, a terminal device receives the second information, where the second information is used to indicate the second resource; and subsequently, the terminal device may directly send the third information on the second resource based on the second information, and does not need to report a BSR to the communications apparatus. This can reduce a link recovery delay.

In some possible implementations, the second resource is a preconfigured resource and/or the second resource is a resource carrying a fixed quantity of bits.

In the communications apparatus in this embodiment of this application, after sending the first information, the terminal device may directly send the third information on the second resource that is preconfigured and/or that carries the fixed quantity of bits, and does not need to report the BSR to the communications apparatus. This can reduce the link recovery delay.

Optionally, the quantity of bits carried in the second resource is related to the first information. For example, when the first information is sent by using different resources or sequences, the quantity of bits of the second resource changes accordingly.

In some possible implementations, the second information is one of the following: downlink control information DCI in a dedicated search space, DCI scrambled by using a dedicated RNTI, or DCI including a preset state value.

In the communications apparatus in this embodiment of this application, the second information is the downlink control information DCI in the dedicated search space, the DCI scrambled by using the dedicated RNTI, or the DCI including the preset state value. The communications apparatus sends the information to the terminal device, and the terminal device may determine that the information is response information of the link failure or response information of the first information. This can ensure reliability of link failure recovery.

In some possible implementations, the sending module is further configured to send fourth information, where the fourth information indicates link failure recovery response information.

In some possible implementations, the fourth information is one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

In the communications apparatus in this embodiment of this application, the fourth information is one of the foregoing information. The communications apparatus sends the foregoing information to the terminal device, and the terminal device may determine that the information is response information of the third information. This can ensure the reliability of link failure recovery.

In some possible implementations, the receiving module is further configured to: receive fifth information on the second resource, where the fifth information indicates a second reference signal and/or the first cell, and channel quality of the second reference signal is greater than or equal to the preset threshold.

In the communications apparatus in this embodiment of this application, when the fourth information is not detected in the first time period, the terminal device resends the fifth information on the second resource, and does not need to re-apply for a resource from the communications apparatus. This can reduce a link failure recovery delay.

In some possible implementations, the receiving module is further configured to: receive sixth information, where the sixth information indicates that link recovery succeeds.

In the communications apparatus in this embodiment of this application, after receiving the sixth information, the communications apparatus may determine that link recovery succeeds, and may release a resource in time. This can reduce resource overheads.

In some possible implementations, the third information and/or the fifth information is link failure recovery request information, and the sending module is further configured to: when the link failure recovery request information is received, continue to send the fourth information; and the apparatus further includes a processing module, configured to: when a quantity of times of sending the fourth information reaches a preset quantity of times and/or the sixth information is not received in a third time period, determine that link recovery fails, where a start moment of the third time period is after a sending moment of the fourth information.

In some possible implementations, the receiving module is further configured to: receive the first information on the first resource, where the first information is used to indicate the link failure.

In the communications apparatus in this embodiment of this application, the terminal device resends the first information when the terminal device does not receive the fourth information, to re-initiate link recovery to the communications apparatus. This can ensure the reliability of link failure recovery.

In some possible implementations, the processing module is further configured to: when a quantity of times of receiving the first information reaches a preset quantity of times, determine that link recovery fails.

In some possible implementations, the second resource is a semi-persistent resource.

In the communications apparatus in this embodiment of this application, when the fourth information is not detected in the first time period, the terminal device resends the fifth information on the second resource, and does not need to re-apply for the second resource from the network device. This can reduce the link recovery delay.

In some possible implementations, the processing module is further configured to: when the sixth information is received, deactivate the second resource; or when determining that link recovery fails, deactivate the second resource.

In the communications apparatus in this embodiment of this application, when link recovery succeeds or link recovery fails, the communications apparatus releases the second resource in time. This can effectively reduce system resource overheads.

In some possible implementations, the first resource is a physical random access channel PRACH resource or a physical uplink control channel PUCCH resource.

In some possible implementations, the second resource is a PRACH resource or a physical uplink shared channel PUSCH resource.

Modules included in the apparatus in the fourth aspect may be implemented in a software and/or hardware manner.

For example, the modules included in the apparatus in the fourth aspect may be implemented by using a processor. To be specific, the apparatus in the fourth aspect may include a processor. The processor is configured to execute a program instruction, to implement functions that can be implemented by the modules included in the apparatus.

Optionally, the apparatus in the fourth aspect may further include a memory, configured to store the program instruction executed by the processor, and even configured to store various types of data.

Optionally, the apparatus in the fourth aspect may be a chip that can be integrated into an intelligent device. In this case, the apparatus may further include a communications interface.

According to a fifth aspect, a computer-readable storage medium is provided. The computer-readable storage medium stores program code to be executed by a communications apparatus, and the program code includes an instruction used to implement the communication method in any one of the first aspect or the possible implementations of the first aspect.

According to a sixth aspect, a computer-readable storage medium is provided. The computer-readable storage medium stores program code to be executed by a communications apparatus, and the program code includes an instruction used to implement the communication method in any one of the second aspect or the possible implementations of the second aspect.

According to a seventh aspect, a chip is provided. The chip includes a processor and a communications interface. The communications interface is configured to communicate with an external device. The processor is configured to implement the communication method in any one of the first aspect or the possible implementations of the first aspect.

Optionally, the chip may further include a memory. The memory stores an instruction. The processor is configured to execute the instruction stored in the memory. When the instruction is executed, the processor is configured to implement the communication method in any one of the first aspect or the possible implementations of the first aspect.

According to an eighth aspect, a chip is provided. The chip includes a processor and a communications interface. The communications interface is configured to communicate with an external device. The processor is configured to implement the communication method in any one of the second aspect or the possible implementations of the second aspect.

Optionally, the chip may further include a memory. The memory stores an instruction. The processor is configured to execute the instruction stored in the memory. When the instruction is executed, the processor is configured to implement the communication method in any one of the second aspect or the possible implementations of the second aspect.

According to a ninth aspect, a computer program product is provided. The computer program product includes an instruction. When the instruction is run on a communications apparatus, the communications apparatus is enabled to perform the communication method in any one of the first aspect or the possible implementations of the first aspect.

According to a tenth aspect, a computer program product is provided. The computer program product includes an instruction. When the instruction is run on a communications apparatus, the communications apparatus is enabled to perform the communication method in any one of the second aspect or the possible implementations of the second aspect.

According to an eleventh aspect, a system is provided. The system includes the communications apparatus in the third aspect and/or the communications apparatus in the fourth aspect.

In the communication method in the embodiments of this application, the terminal device may directly send the third information on the second resource based on an indication of the second information, to initiate link recovery to the network device, and does not need to report a BSR to the network device. This can reduce a link recovery delay.

DESCRIPTION OF EMBODIMENTS

Figure 1:
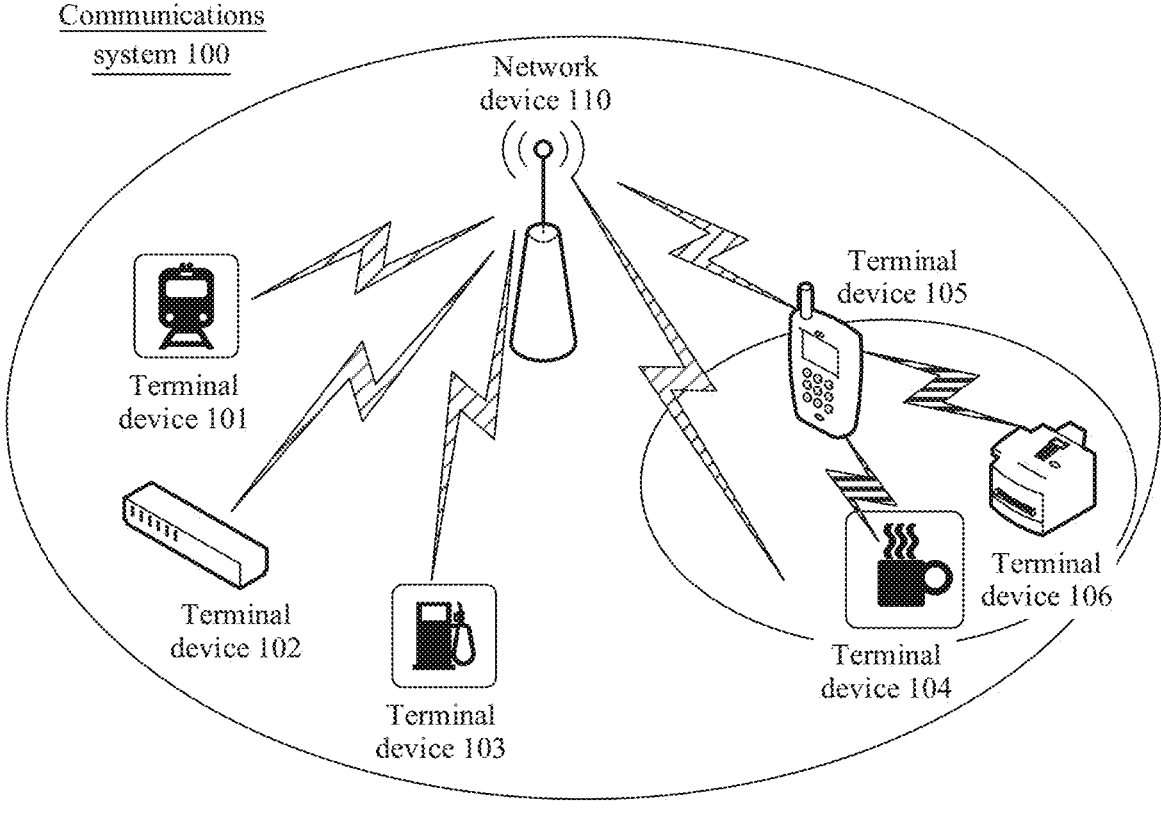
FIG. 1 is an architectural diagram of an example of a communications system to which an embodiment of this application is applicable.

The following describes technical solutions of this application with reference to the accompanying drawings.

The technical solutions of the embodiments of this application may be applied to various communications systems, such as a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, a future 5th generation (5th generation, 5G) system, or a new radio (new radio, NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

By way of example and not limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not only a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the terminal device in the embodiments of this application may alternatively be a terminal device in an Internet of things (internet of things, IoT) system. IoT is an important part of future development of information technologies, and a main technical feature of the IoT is connecting a thing to a network by using a communications technology, to implement an intelligent network for interconnection between a person and a machine or between one thing and another. In the embodiments of this application, an IoT technology may implement massive connections, deep coverage, and terminal power saving by using, for example, a narrowband (narrow band) NB technology.

In addition, in the embodiments of this application, the terminal device may alternatively include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

The network device in the embodiments of this application may be a device configured to communicate with the terminal device. The network device may be a base transceiver station (base transceiver station, BTS) in the global system for mobile communications (global system of mobile communications, GSM) system or the code division multiple access (code division multiple access, CDMA) system, may be a NodeB (NodeB, NB) in the wideband code division multiple access (wideband code division multiple access, WCDMA) system, may be an evolved NodeB (evolved NodeB, eNB or eNodeB) in the LTE system, or may be a radio controller in a cloud radio access network (cloud radio access network, CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

It should be understood that the technical solutions provided in this application may be applicable to various communications systems, for example, a 5G mobile communications system. The 5G mobile communications system in this application includes a non-standalone (non-standalone, NSA) 5G mobile communications system and/or a standalone (standalone, SA) 5G mobile communications system. The technical solutions provided in this application may be further applied to a future communications system such as a sixth generation mobile communications system.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus or a product that uses standard programming and/or engineering technologies. The term "product" used in this application covers a computer program that can be accessed from any computer-readable device, carrier or medium. For example, the computer-readable medium may include but is not limited to a magnetic storage device (for example, a hard disk, a floppy disk, or a magnetic tape), an optical disc (for example, a compact disc (compact disc, CD) or a digital versatile disc (digital versatile disc, DVD)), or a smart card and a flash storage device (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

FIG. 1 is an architectural diagram of an example of a communications system 100 to which an embodiment of this application is applicable. The method in the embodiments of this application may be applicable to the communications system 100 shown in FIG. 1. It should be understood that the communications system 100 to which the method in the embodiments of this application may be applicable may include more or fewer network devices or terminal devices.

A network device or a terminal device in FIG. 1 may be hardware, or may be software obtained through functional division, or a combination thereof. The network device or the terminal device in FIG. 1 may communicate with each other by using another device or network element.

In the communications system 100 shown in FIG. 1, a network device 110 and terminal devices 101 to 106 form the communications system 100. In the communications system 100, the network device 110 may send downlink data to the terminal devices 101 to 106. Certainly, the terminal devices 101 to 106 may also send uplink data to the network device 110. It should be understood that each of the terminal devices 101 to 106 may be, for example, a cellular phone, a smartphone, a portable computer, a handheld communications device, a handheld computing device, a satellite radio apparatus, a global positioning system, a PDA, and/or any other appropriate device used for communication in the wireless communications system 100.

The communications system 100 may be a PLMN network, a device-to-device (device-to-device, D2D) network, a machine to machine (machine to machine, M2M) network, an IoT network, or another network.

In addition, the terminal devices 104 to 106 may also form a communications system. In the communications system, the terminal device 105 may send downlink data to the terminal device 104 or the terminal device 106. Correspondingly, the terminal device 104 or the terminal device 106 may also send uplink data to the terminal device 105.

Figure 2:
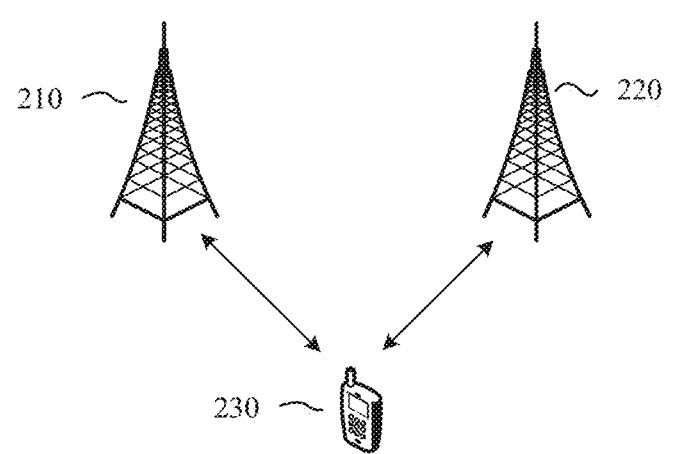
FIG. 2 is an architectural diagram of an example of another communications system to which an embodiment of this application is applicable.

FIG. 2 is an architectural diagram of an example of a communications system 200 to which an embodiment of this application is applicable. As shown in the figure, the communications system 200 may include at least two network devices such as network devices 210 and 220 shown in FIG. 2. The communications system 200 may further include at least one terminal device such as a terminal device 230 shown in FIG. 2. The terminal device 230 may establish a radio link to the network device 210 and the network device 220 by using a dual connectivity (dual connectivity, DC) technology or a multi-connectivity technology. The network device 210 may be, for example, a master eNodeB (master eNodeB, MeNB), and the network device 210 may be, for example, a secondary eNodeB (secondary eNodeB, SeNB). In this case, the network device 210 is a network device used when the terminal device 230 performs initial access, and is responsible for radio resource control (radio resource control, RRC) communication with the terminal device 230. The network device 220 may be added during RRC reconfiguration, and is configured to provide an additional radio resource.

Certainly, the network device 220 may alternatively be a primary base station, and the network device 210 may alternatively be a secondary base station. This is not limited in this application. In addition, for ease of understanding only, the figure shows a case in which the two network devices are connected to the terminal device in a wireless manner. However, this should not constitute any limitation on a scenario to which this application is applicable. The terminal device may further establish a radio link with more network devices.

A plurality of antennas may be configured for each communications device, such as the network device 210, the network device 220, or the terminal device 230 in FIG. 2. The plurality of antennas may include at least one transmit antenna used to send a signal and at least one receive antenna used to receive a signal. In addition, each communications device additionally includes a transmitter chain and a receiver chain. A person of ordinary skill in the art may understand that the transmitter chain and the receiver chain each may include a plurality of components related to signal sending and receiving (for example, a processor, a modulator, a multiplexer, a demodulator, a demultiplexer, or an antenna). Therefore, a network device and a terminal device may communicate with each other by using a multiple-antenna technology.

For ease of understanding the embodiments of this application, the following first briefly describes several terms in this application.

1. Beam (Beam)

The beam is a communications resource. The beam may be a wide beam, a narrow beam, or a beam of another type. A technology for forming the beam may be a beamforming technology or another technology. The beamforming technology may be specifically a digital beamforming technology, an analog beamforming technology, or a mixed digital/analog beamforming technology. Different beams may be considered as different resources. Same information or different information may be sent on different beams. Optionally, a plurality of beams having same or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It may be understood that, one or more antenna ports forming one beam may also be considered as one antenna port set.

Beams may be classified into a transmit beam and a receive beam of the network device, and a transmit beam and a receive beam of the terminal device. The transmit beam of the network device is used to describe transmit-side beamforming information of the network device, and the receive beam of the base station is used to describe receive-side beamforming information of the network device. The transmit beam of the terminal device is used to describe transmit-side beamforming information of the terminal device, and the receive beam of the terminal is used to describe receive-side beamforming information of the terminal device. To be specific, a beam is used to describe beamforming information.

The beam may correspond to a time resource, a space resource, and/or a frequency domain resource.

Optionally, the beam may further correspond to a reference signal resource (for example, a reference signal resource for beamforming) or beamforming information.

Optionally, the beam may further correspond to information associated with a reference signal resource of the network device. A reference signal may be a channel state information reference signal (channel state information reference signal, CSI-RS), a synchronization signal/physical broadcast channel block (synchronization signal/physical broadcast channel block, SSB), a demodulation reference signal (demodulation reference signal, DMRS), a phase tracking signal (phase tracking reference signal, PTRS), a tracking signal (tracking reference signal, TRS), or the like. The information associated with the reference signal resource may be a reference signal resource identifier, QCL information (especially QCL-TypeD), or the like. The reference signal resource identifier corresponds to a transmit-receive beam pair that is previously established during measurement based on the reference signal resource. The terminal may infer beam information based on the reference signal resource index.

Optionally, the beam may further correspond to a spatial domain filter (spatial filter, spatial domain filter), or a spatial domain transmission filter (spatial domain transmission filter).

2. Antenna Port (Antenna Port)

The antenna port may be referred to as a port. The port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

3. Quasi-Co-Location (Quasi-Co-Location, QCL)

The Quasi-co-location may also be referred to as a quasi-co-location, a quasi-co-site, or a co-location. Signals corresponding to antenna ports that have a QCL relationship have a same or similar parameter, or a parameter of one antenna port may be used to determine a parameter of another antenna port that has a QCL relationship with the antenna port, or two antenna ports have a same or similar parameter, or a parameter difference between two antenna ports is less than a threshold. The parameter may include one or more of the following: a delay spread (delay spread), a Doppler spread (Doppler spread), a Doppler shift (Doppler shift), an average delay (average delay), an average gain, and a spatial receive parameter (spatial Rx parameter). The spatial receive parameter may include one or more of the following: an angle of arrival (angle of arrival, AOA), an average AOA, an AOA spread, an angle of departure (angle of departure, AOD), an average angle of departure AOD, an AOD spread, a receive antenna spatial correlation parameter, a transmit antenna spatial correlation parameter, a transmit beam, a receive beam, or a resource identifier.

The foregoing angles may be decomposition values at different dimensions or a combination of decomposition values at different dimensions. The antenna ports are antenna ports having different antenna port numbers, and/or antenna ports that have a same antenna port number and that are used to send or receive information at different time, on different frequencies, and/or on different code domain resources, and/or antenna ports that have different antenna port numbers and that are used to send or receive information at different time, on different frequencies, and/or on different code domain resources. The resource identifier may include: a CSI-RS resource identifier, an SRS resource identifier, an SSB resource identifier, a resource identifier of a preamble sequence transmitted on a physical random access channel (physical random access channel, PRACH), or a resource identifier of a demodulation reference signal (demodulation reference signal, DMRS), used to indicate a beam on a resource.

In an NR protocol, the QCL relationship may be classified into the following four types based on different parameters:

type A (type A): Doppler shift, Doppler spread, average delay, and delay spread;

type B (type B): Doppler shift and Doppler spread;

type C (type C): Doppler shift and average delay; and type D (type D): spatial receive parameter.

When the QCL relationship is the QCL-TypeD relationship, the QCL relationship may be considered as a spatial QCL relationship. When the antenna ports satisfy the spatial QCL relationship, a QCL relationship between a port for a downlink signal and a port for a downlink signal or between a port for an uplink signal and a port for an uplink signal may be that the two signals have a same AOA or AOD, and is used to indicate that the two signals have a same receive beam or transmit beam. For another example, a QCL relationship between a downlink signal and an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmit beam based on a downlink receive beam or determine a downlink receive beam based on an uplink transmit beam.

From a perspective of a transmit end, if two antenna ports are spatial QCLed, it may mean that corresponding beam directions of the two antenna ports are consistent in space. From a perspective of a receive side, if two antenna ports are spatial QCLed, it may mean that the receive side can receive, in a same beam direction, signals sent by using the two antenna ports.

Signals transmitted on ports having a spatial QCL relationship may further have corresponding beams. The corresponding beam includes at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL relationship may alternatively be understood as signals received or sent by using a same spatial filter (spatial filter). The spatial filter may be at least one of the following: precoding, a weight of an antenna port, a phase deflection of an antenna port, or an amplitude gain of an antenna port.

Signals transmitted on ports having a spatial QCL relationship may alternatively be understood as having corresponding beam pair links (beam pair link, BPL). The corresponding BPL includes at least one of the following: a same downlink BPL, a same uplink BPL, an uplink BPL corresponding to a downlink BPL, and a downlink BPL corresponding to an uplink BPL.

Therefore, the spatial receive parameter (namely, the QCL-TypeD) may be understood as a parameter used to indicate direction information of a receive beam.

4. Component Carrier (Component Carrier, CC)/Carrier Aggregation (Carrier Aggregation, CA)

A component carrier is a carrier in multi-carrier aggregation, and each carrier includes one or more PRBs. Optionally, each carrier may have a corresponding PDCCH, and a PDSCH for scheduling a CC of the carrier, or some carriers have no PDCCH. In this case, cross-carrier scheduling may be performed on the carriers, that is, a PDCCH of one CC schedules a PDSCH of another CC. The UE may receive data on a plurality of CCs. The component carrier may also be referred to as a component carrier, a component carrier, a member carrier, or the like.

The CA aggregation means to aggregate a plurality of contiguous or non-contiguous component carriers to provide a larger bandwidth.

5. Primary Cell/Primary Serving Cell (Primary Cell/Primary Serving Cell, PCell)

The primary cell/primary serving cell is a cell on which CA UE camps. Generally, only the PCell has a physical uplink control channel (physical uplink control channel, PUCCH).

6. Primary Secondary Cell (Primary Secondary Cell, PSCell)

The primary secondary cell is a special secondary cell that is on a SeNB and that is configured by the MeNB for DC UE by using radio resource control (radio resource control, RRC) signaling.

7. Secondary Cell/Secondary Serving Cell (Secondary Cell/Secondary Serving Cell, SCell)

The secondary cell/secondary serving cell is a cell configured for the CA UE by using RRC connection signaling. The secondary cell/secondary serving cell works on a secondary carrier component (secondary carrier component, SCC), and can provide more radio resources for the CA UE. In a SCell, there can be downlink transmission only or both downlink and uplink transmission.

8. Special Cell (Special Cell, SpCell)

SpCell: In a DC scenario, the SpCell is a PCell in a master cell group (master cell group, MCG) or a PSCell in a secondary cell group (secondary cell group, SCG). Alternatively, in a CA scenario, the SpCell is a PCell.

In the prior art, in a multi-carrier scenario, each CC corresponds to one cell, and a terminal device configured with CA or DC may be connected to one PCell, or may be connected to one PSCell. The PCell or the PSCell is an initially accessed cell. Alternatively, the terminal device may be connected to a plurality of SCells, and the SCells are configured by using RRC after access, so that more radio resources can be provided. If the SCell is not configured with an uplink resource, when a link failure occurs in the SCell, an uplink PRACH resource of the PCell or the PSCell needs to be used to recover the link of the SCell. Therefore, the PCell needs to configure a plurality of PRACH resources for each SCell.

During link recovery, the UE sends a scheduling request (where the scheduling request may also be referred to as link failure recovery request information) to the network device by using a PUCCH, to request the network device to configure an uplink resource. After receiving the SR, the network device schedules the uplink resource by using DCI, and the UE reports a BSR by using the uplink resource. The BSR is used to indicate a quantity of pieces of uplink data that the UE needs to send, and then the network device allocates a PUSCH resource of a corresponding size to the UE based on the BSR. Correspondingly, the UE sends a newly identified downlink on the uplink resource allocated by the network device. In this case, if the UE receives link failure recovery response information from the network device, link recovery succeeds. The link recovery process takes an excessively long time.

In this application, the link failure may also be referred to as a communications link failure, a communications link fault, a link fault, a beam failure, a communication fault, a communication failure, or the like. The link failure may be understood as that a reference signal used for beam failure detection of a PDCCH is less than a preset threshold. In this specification, these concepts have the same meaning.

In this application, link failure recovery may also be referred to as recovery of communication between the network device and the terminal device, beam failure recovery, link reconfiguration, communications link failure recovery, link fault recovery, communication fault recovery, communication failure recovery, link recovery, beam recovery, communications link recovery, communication recovery, or the like.

In this application, the link failure recovery request information may also be referred to as beam failure recovery request information, communications link fault recovery request information, communications link failure recovery request information, beam fault recovery request information, link reconfiguration request information, link fault recovery request information, communication fault recovery request information, or communication failure recovery request information, reconfiguration request information, link failure request information, link failure information, scheduling request information, link recovery request information, beam recovery request information, communications link recovery request information, communication recovery request information, and the like.

In specific implementation, the two sets: the reference signal resource set used for the beam failure detection and the reference signal resource set used to recover the link (for example, the link between the terminal device and the network device) may alternatively have other names. This is not specifically limited in this application.

It should be understood that, in this application, that link recovery fails may be understood as that the terminal device no longer sends first information and/or third information, or may be understood as stopping timing of a link failure recovery clock, or may be understood as stopping counting or the like of a link failure recovery counter.

It should be understood that in this application, a time unit may be one or more radio frames, one or more subframes, one or more slots, one or more mini slots (mini slot), one or more orthogonal frequency division multiplexing (orthogonal frequency division multiplexing, OFDM) symbols, or the like defined in an LTE system or a 5G NR system, or may be a time window including a plurality of frames or subframes, for example, a system information (system information, SI) window.

It should be understood that, in this application, quasi co-location QCL indication information of a first cell may be MAC-CE and/or RRC signaling, and the quasi co-location QCL indication information of the first cell may be used to indicate TCI information and/or QCL information of a PDCCH or a PDSCH of the first cell.

Based on the problem described in the Background, this application provides a communication method, to reduce a link recovery delay. In the embodiments of this application, an example in which a terminal device is connected to one PCell and at least one SCell, and a link failure occurs in one SCell is used to describe the communication method in the embodiments of this application.

For ease of description, in the following embodiments of this application, the SCell is referred to as a first cell, and the PCell is referred to as a second cell. It should be understood that the first cell and the second cell in this application are merely examples but not limitations. For example, the first cell may alternatively be a PCell, a PSCell, a SpCell, or a TRP, and the second cell may alternatively be a PSCell, a SCell, a SpCell, or a TRP. This is not limited in the embodiments of this application.

The following describes in detail the communication method in the embodiments of this application with reference to FIG. 3 to FIG. 7.

Figure 3:
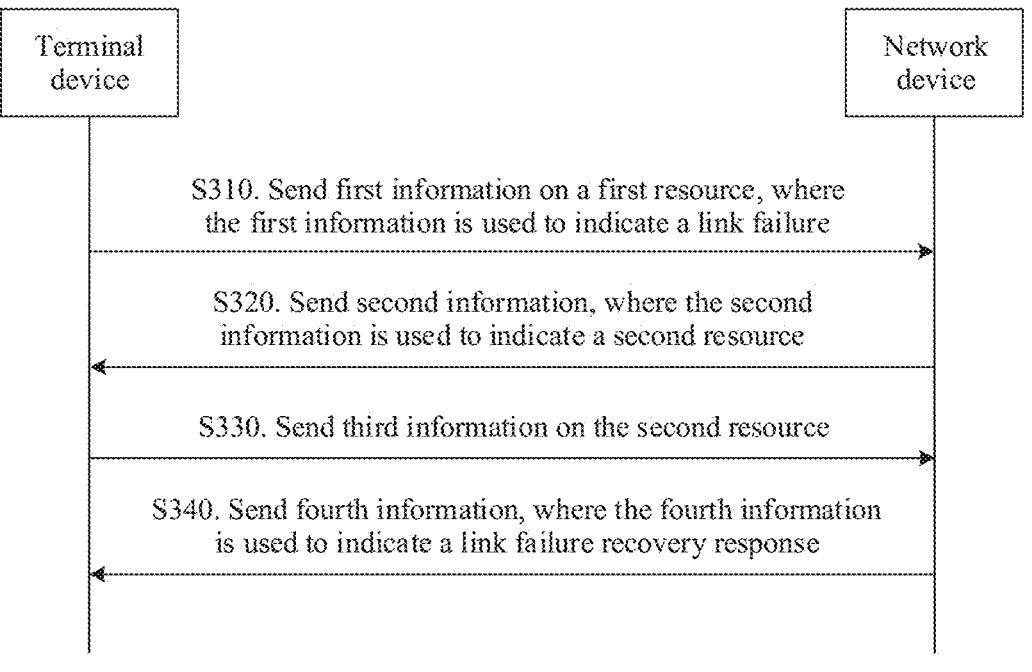
FIG. 3 is a schematic flowchart of a communication method according to an embodiment of this application.

FIG. 3 is a schematic flowchart of a communication method 300 according to an embodiment of this application. It should be understood that FIG. 3 shows steps or operations of the communication method. However, these steps or operations are merely examples. In this embodiment of this application, other operations or variations of the operations in FIG. 3 may be further performed, or not all steps need to be performed. Alternatively, these steps may be performed in other orders.

S310. A terminal device sends first information on a first resource, where the first information is used to indicate a link failure. Correspondingly, a network device receives the first information on the first resource.

The first resource may be a resource of the second cell, and the second cell is a cell different from the first cell, for example, a resource in a PCell. Optionally, the first resource may be a resource used to carry an SR. Optionally, the first resource may be a resource dedicated to indicating the link failure.

Optionally, the first resource may be a physical random access channel PRACH resource or a physical uplink control channel PUCCH resource.

In this embodiment of this application, that the first information is used to indicate a link failure may be understood as that the first information is used to request second information and/or fourth information, or the first information is request information of second information and/or fourth information.

In this embodiment of this application, the first information may be link failure recovery request information, an SR, or link failure information. It should be understood that the first information is used to notify the network device of the link failure. The first information is not limited in this embodiment of this application, and the first information may alternatively be other information indicating the link failure to the network device.

S320. The network device sends the second information, where the second information is used to indicate a second resource. Correspondingly, the terminal device receives the second information.

The second resource may be a resource of the second cell, and the second cell is a cell different from the first cell, for example, a resource in a PCell.

Optionally, the second resource may be a preconfigured resource and/or the second resource may be a resource carrying a fixed quantity of bits.

In this embodiment of this application, the terminal device may send third information on the second resource that is preconfigured and/or that carries the fixed quantity of bits, and does not need to report a BSR to the network device. This can reduce a link recovery delay.

Optionally, the second resource may be a PRACH resource or a physical uplink shared channel PUSCH resource.

Optionally, when the second resource is the PRACH resource, the second resource may be a resource of the first cell.

Optionally, the second resource may be a semi-persistent (semi-persistent) resource. In this case, sending of the link failure recovery request information does not need to be scheduled by using the second information each time. This can reduce the link recovery delay. For example, if the link failure recovery request information (for example, the third information or fifth information) needs to be retransmitted, the terminal device may no longer send the first information nor wait for the second information, but directly send the link failure recovery request information on the second resource. The method can reduce the link failure recovery delay.

In a possible implementation, the second information may be DCI signaling, and the second information may be used to trigger, activate, or schedule the second resource. For example, the second information may be used to schedule an aperiodic second resource. For another example, the second information may be used to trigger (trigger) or activate (activate) the semi-persistent second resource. In this case, the network device may send the second information after receiving the first information.

Optionally, the network device may preconfigure the second resource for the terminal device by using RRC signaling, or the network device may preconfigure the second resource for the terminal device by using a MAC-CE.

In another possible implementation, the second resource may be a semi-persistent resource or a persistent resource associated with the first information, or a semi-persistent resource or a persistent resource associated with the first resource carrying the first information. The resource may be a resource configured by using RRC signaling or MAC-CE signaling. In this case, the second information may be RRC signaling or MAC-CE signaling, and the network device may send the second information before receiving the first information.

Optionally, the network device and the terminal device may preset a fixed quantity of bits (bit) carried by the second resource. For example, the network device and the terminal device may preset that the second resource is 9 bits or 11 bits.

Optionally, the quantity of bits carried by the second resource may be specified in advance in a communications protocol. Alternatively, the quantity of bits carried by the second resource may be specified in advance in another manner.

In this embodiment of this application, the second information may be one of the following: DCI in a dedicated search space, DCI scrambled by using a dedicated radio network temporary identifier RNTI, or DCI including a preset state value.

In this embodiment of this application, the second information is the downlink control information DCI in the dedicated search space, the DCI scrambled by using the dedicated RNTI, or the DCI including the preset state value. After receiving the information, the terminal device may determine that the information is response information of a link failure. This avoids a case in which the terminal device cannot distinguish whether DCI or a UL grant sent by the network device is a response to the first information or a response to SR information of a normal uplink data scheduling request. This can ensure reliability of link failure recovery.

Optionally, a cyclic redundancy check (cyclic redundancy check, CRC) of the DCI in the dedicated search space may be scrambled by using a C-RNTI, or a CRC of the DCI in the dedicated search space may be scrambled by using an MCS-C-RNTI, or a CRC of the DCI in the dedicated search space may be scrambled by using an RA-RNTI.

Optionally, the DCI including the preset state value may mean that the DCI includes a special resource indication. For example, a channel state information (channel state information, CSI) request (request) field of the DCI may be 0.

In this embodiment of this application, optionally, if the terminal device does not receive the second information within a preset time period, the terminal device may resend the first information. The first information is resent when the second information is not received. This can ensure the reliability of link failure recovery.

Optionally, when a quantity of times of sending the first information reaches a preset quantity of times, the terminal device determines that link recovery fails.

S330. The terminal device sends the third information on the second resource. Correspondingly, the network device receives the third information on the second resource.

The third information may be used to indicate a first reference signal. Channel quality of the first reference signal may be greater than or equal to a preset threshold. After receiving the third information, the network device may perform link recovery based on the first reference signal. Alternatively, the third information may be used to indicate, to the first cell, that a link failure occurs in the first cell. After receiving the third information, the network device may perform link recovery on the first cell. Alternatively, the third information may indicate both the first reference signal and the first cell. For example, after receiving the third information, the network device may recover a link of the first cell based on the first reference signal. Optionally, the first reference signal is a reference signal in a reference signal set dedicated to link recovery. Alternatively, the first reference signal may be a reference signal in a reference signal set used in a beam management or beam training process.

Particularly, when the second resource is a PRACH resource, the third information may indicate only the first reference signal. In this case, the first information may be used to indicate the first cell or indicate the first cell by using another piece of information.

Optionally, the third information may be a MAC-CE.

In this embodiment of this application, the terminal device may send the third information on the second resource based on the second information, where the third information is used to indicate the first reference signal and/or the first cell. Correspondingly, the network device may receive the third information on the second resource based on the second information.

Optionally, the first information and the third information may be sent at the same time or at different time. In other words, the first information and the third information may be sent at the same time, or the first information may be sent before the third information is sent. An execution sequence is not limited in the present invention.

Optionally, before S330, the terminal device may identify, for the first cell, the first reference signal whose channel quality is greater than or equal to the preset threshold.

Optionally, when the second resource is a PRACH resource, the second resource may be associated with the first reference signal.

Optionally, the second resource may be associated with the first reference signal. After receiving the third information on the second resource, the network device may determine the first reference signal associated with the second resource. In this case, the network device may perform link recovery based on the first reference signal.

In the communication method in this embodiment of this application, the terminal device may directly send the third information on the second resource based on an indication of the second information, to initiate link recovery to the network device, and does not need to report a BSR to the network device. This can reduce a link recovery delay.

Optionally, the method may further include S340.

S340. The network device sends fourth information, where the fourth information indicates link failure recovery response information. Correspondingly, the terminal device detects the fourth information in a first time period.

A start moment of the first time period may be after a sending moment of the third information.

For example, the start moment of the first time period may be an $m^{th}$ time unit after the sending moment of the third information. For another example, the start moment of the first time period may be an $n^{th}$ time-frequency resource, used to send a downlink control channel, after the sending moment of the third information. m and n are positive integers.

Optionally, the terminal device may detect the fourth information in the first time period based on the third information.

Optionally, the fourth information may be response information of the first information. Alternatively, the fourth information may be response information of the third information.

In this embodiment of this application, that the fourth information indicates link failure recovery response information may be understood as that the fourth information indicates the response information of the first information. Alternatively, the fourth information indicates the response information of the third information.

Optionally, the fourth information may be one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

Optionally, the fourth information may be a PDSCH or a PUSCH scheduled by using the DCI.

Optionally, when the fourth information is the PDSCH or the PUSCH scheduled by using the DCI, or when the fourth information is the quasi co-location QCL indication information of the first cell, an ACK is sent when the fourth information is detected; and/or a NACK is sent when the fourth information is not detected. Optionally, in this case, the fifth information is a NACK, and/or the sixth information is an ACK, and the terminal device may send the sixth information or the fifth information by using an uplink resource for feeding back a HARQ. In other words, in this case, the terminal device may not feed back the fifth information and/or the sixth information on the second resource. For example, if the terminal device detects the fourth information in the first time period, the terminal device may feed back an ACK, that is, the sixth information. If the terminal device does not detect the fourth information in the first time period, the terminal device may feed back a NACK, that is, the fifth information. After receiving the NACK information, the network device may resend the fourth information.

It should be understood that, in this embodiment of this application, the QCL indication information may be MAC-CE and/or RRC signaling, and the QCL indication information may be used to indicate TCI information/QCL information of a PDCCH or a PDSCH.

Optionally, the DCI in the preset format is DCI having a toggled new data indicator (New data indicator, NDI) field, and the NDI field is a field in the DCI. For example, if a state value of the NDI field in the DCI is 0 last time, and the state value of the NDI field in the DCI is 1 this time, it is considered that the data transmitted herein is newly transmitted data.

Optionally, the DCI in the preset format may be in a DCI format (format) 0-0, and an NDI field in the DCI format 0-0 needs to be toggled. Alternatively, the DCI in the preset format may be in a DCI format (format) 0-1, and an NDI field in the DCI format 0-1 needs to be toggled. Alternatively, the DCI in the preset format may be DCI in another format agreed on in advance. This is not limited in this embodiment of this application.

Particularly, when the second resource is a PUSCH resource, and the second resource is an aperiodic resource, the fourth information may be the DCI in the preset format. In this case, an NDI field of the DCI in the preset format is toggled.

In this embodiment of this application, the fourth information is one of the foregoing information. After receiving the foregoing information, the terminal device may determine that the information is the response information of the third information. This can ensure reliability of link failure recovery.

Optionally, the fourth information may be sent based on a reference signal in the third information or the fifth information. For example, the fourth information and the reference signal indicated in the third information or the fifth information meet a QCL relationship. This may also be understood as that the terminal device receives the fourth information by using a spatial correlation parameter corresponding to the reference signal indicated in the third information or the fifth information. The terminal device may determine, by receiving the fourth information, that the reference signal indicated in the third information or the fifth information is available, thereby ensuring the reliability of link failure recovery. That is, the terminal device determines that the newly identified downlink (the reference signal indicated in the third information or the fifth information) is available, thereby ensuring reliable transmission of the link.

In this embodiment of this application, optionally, when the fourth information is the QCL indication information, the network device may send the fourth information to the terminal device by using a resource in the second cell. Alternatively, when the fourth information is the DCI scrambled by using the C-RNTI, the DCI scrambled by using the MCS-C-RNTI, the DCI in the dedicated search space, the DCI scrambled by using the dedicated RNTI, the DCI scrambled by using the RA-RNTI, the DCI including the preset state value, the DCI including the transmission configuration indication TCI information, or the DCI in the preset format, the network device may send the fourth information to the terminal device by using a resource in the first cell.

In this embodiment of this application, the fourth information may indicate the link failure recovery response information. When the terminal device receives the fourth information, the terminal device may consider that link recovery succeeds.

Optionally, when the terminal device detects the fourth information in the first time period, the terminal device may send the sixth information on the second resource, where the sixth information may indicate that link recovery succeeds. Correspondingly, the network device may receive the sixth information on the second resource.

Optionally, when the second resource is a PRACH resource, the terminal device may send the fifth information by using the second resource, or may send the sixth information by using a third resource, where the third resource is different from the second resource.

In this embodiment of this application, after receiving the sixth information, the network device may determine that link recovery succeeds, and may release a resource in time or stop a link failure recovery procedure in time. This can reduce resource overheads and save power. For example, when the second resource is a semi-persistent resource or a persistent resource, the network device may release the second resource after receiving the sixth information. (The released resource may be used for data transmission of other users to improve resource utilization.)

In this embodiment of this application, after it is determined that link recovery succeeds, timing of a second time period may be stopped, and/or the network device and the terminal device may send a PDSCH, a PDCCH, a PUSCH, a PUCCH, an SRS, a CSI-RS, or the like based on the first reference signal. After the terminal device receives TCI information configured by the network device for the first cell, the network device and the terminal device may transmit a signal or a channel based on the TCI information.

Figure 6:
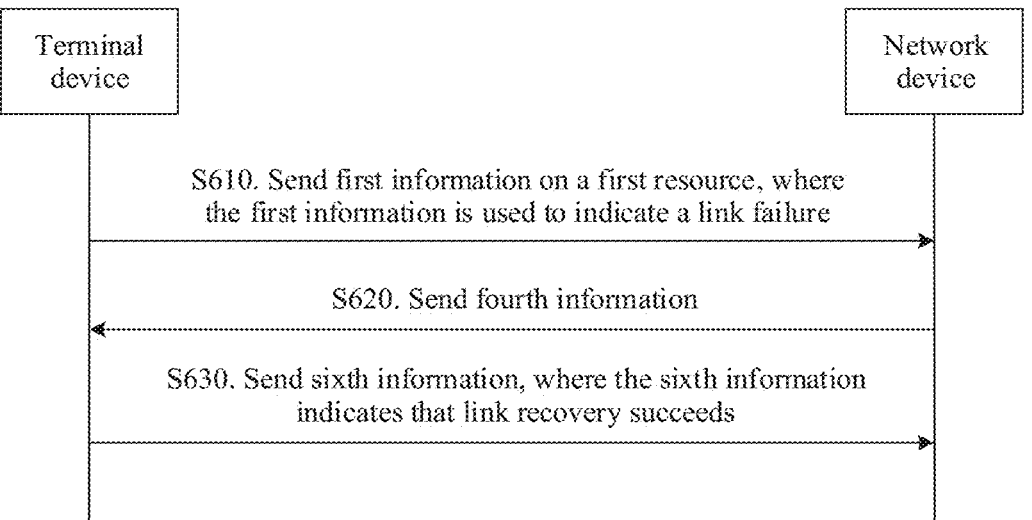
FIG. 6 is a schematic flowchart of a communication method according to another embodiment of this application.
Figure 7:
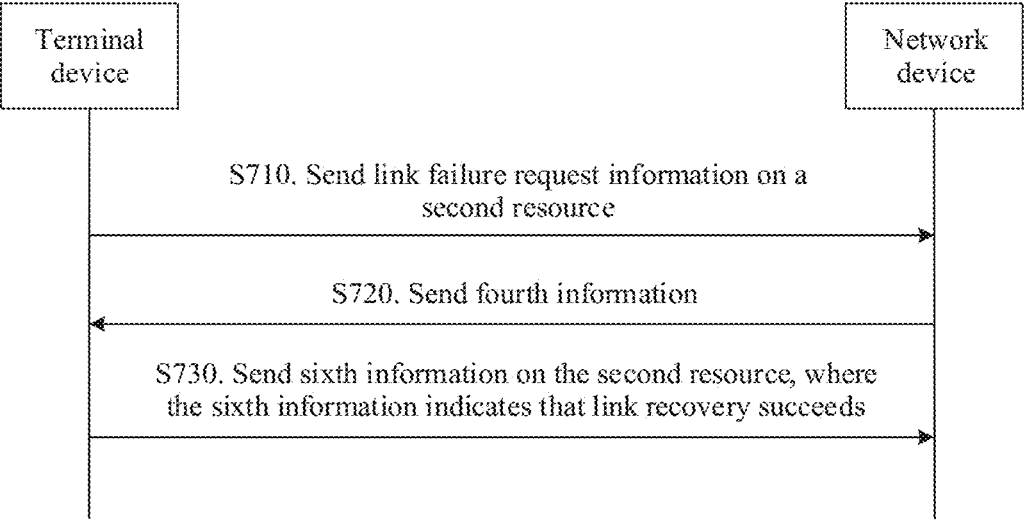
FIG. 7 is a schematic flowchart of a communication method according to another embodiment of this application.

In this embodiment of this application, when the terminal device does not detect the fourth information in the first time period, the terminal device may re-initiate link failure recovery. A process in which the terminal device re-initiates the link failure recovery to the network device is shown in FIG. 6 and FIG. 7.

Figure 4:
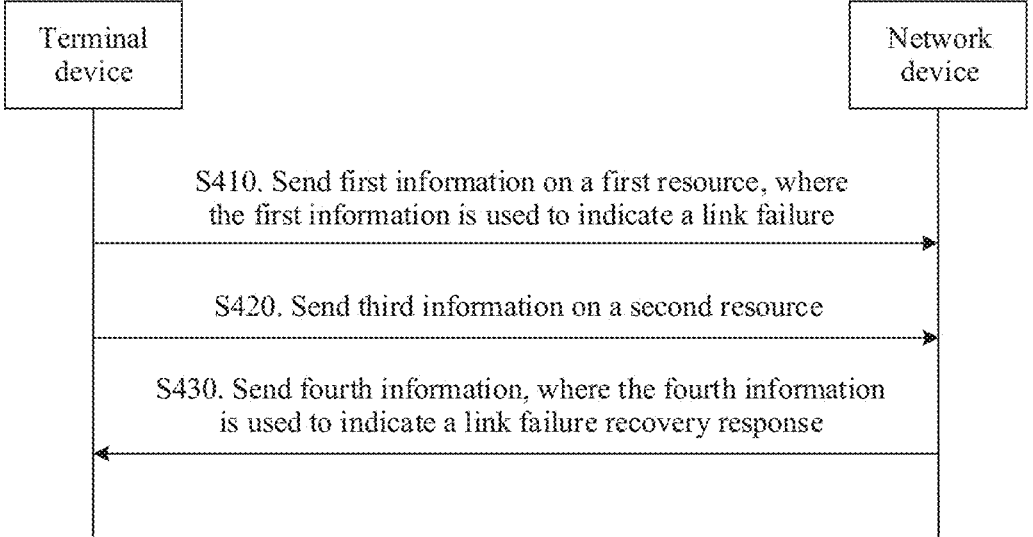
FIG. 4 is a schematic flowchart of a communication method according to another embodiment of this application.

FIG. 4 is a schematic flowchart of a communication method 400 according to another embodiment of this application. It should be understood that FIG. 4 shows steps or operations of the communication method. However, these steps or operations are merely examples. In this embodiment of this application, other operations or variations of the operations in FIG. 4 may be further performed, or not all steps need to be performed. Alternatively, these steps may be performed in other orders.

S410. A terminal device sends first information on a first resource, where the first information is used to indicate a link failure. Correspondingly, a network device receives the first information on the first resource.

The first resource may be a resource of the second cell, and the second cell is a cell different from the first cell, for example, a resource in a PCell.

Optionally, the first resource may be a resource used to carry an SR. Optionally, the first resource may be a resource dedicated to indicating the link failure.

Optionally, the first resource may be a physical random access channel PRACH resource or a physical uplink control channel PUCCH resource.

In this embodiment of this application, that the first information is used to indicate a link failure may be understood as that the first information is used to request second information, or the first information is request information of second information.

In this embodiment of this application, the first information may be link failure recovery request information, an SR, or link failure information. It should be understood that the first information is used to notify the network device of the link failure. The first information is not limited in this embodiment of this application, and the first information may alternatively be other information indicating the link failure to the network device.

S420. The terminal device sends third information on a second resource. Correspondingly, the network device receives the third information on the second resource.

The third information may be used to indicate a first reference signal. Channel quality of the first reference signal may be greater than or equal to a preset threshold. After receiving the third information, the network device may perform link recovery based on the first reference signal. Alternatively, the third information may be used to indicate, to a first cell, that a link failure occurs in the first cell. After receiving the third information, the network device may perform link recovery on the first cell. Alternatively, the third information may indicate both the first reference signal and the first cell. For example, after receiving the third information, the network device may recover a link of the first cell based on the first reference signal. Optionally, the first reference signal is a reference signal in a reference signal set dedicated to link recovery. Alternatively, the first reference signal may be a reference signal in a reference signal set used in a beam management or beam training process.

Particularly, when the second resource is a PRACH resource, the third information may indicate only the first reference signal. In this case, the first information may be used to indicate the first cell or indicate the first cell by using another piece of information.

Optionally, the third information may be a MAC-CE. Optionally, the second resource may be a preconfigured resource and/or the second resource may be a resource carrying a fixed quantity of bits.

In this embodiment of this application, the terminal device may send third information on the second resource that is preconfigured and/or that carries the fixed quantity of bits, and does not need to report a BSR to the network device. This can reduce a link recovery delay.

Optionally, the second resource may be a semi-persistent (semi-persistent) resource.

In this embodiment of this application, the second resource is a semi-persistent resource, and does not need to be scheduled by using the second information. This can reduce the link recovery delay. In this embodiment of this application, the network device may preconfigure the second resource for the terminal device by using RRC signaling, or the network device may preconfigure the second resource for the terminal device by using a MAC-CE.

Optionally, the network device and the terminal device may preset a fixed quantity of bits (bit) carried by the second resource. For example, the network device and the terminal device may preset that the second resource is 9 bits or 11 bits.

Optionally, the quantity of bits carried by the second resource may be specified in advance in a communications protocol. Alternatively, the quantity of bits carried by the second resource may be specified in advance in another manner.

Optionally, the second resource may be a PRACH resource or a physical uplink shared channel PUSCH resource.

Optionally, when the second resource is a PRACH resource, the second resource may be a resource of the first cell.

In this embodiment of this application, the second resource may be a semi-persistent resource or a persistent resource associated with the first information, and the terminal device may send the third information on the second resource associated with the first information. Alternatively, the second resource may be a semi-persistent resource or a persistent resource associated with the first resource carrying the first information.

Optionally, the first information and the third information may be sent at the same time or at different time. In other words, the first information and the third information may be sent at the same time, or the first information may be sent before the third information is sent. An execution sequence is not limited in the present invention. For example, after sending the first information, the terminal device may send the link failure recovery request information on the second resource associated with the first information.

Optionally, before S420, the terminal device may identify, for the first cell, the first reference signal whose channel quality is greater than or equal to the preset threshold.

Optionally, when the second resource is a PRACH resource, the second resource may be associated with the first reference signal.

Optionally, in S420, the terminal device may send the third information on the second resource. Because the second resource may be associated with the first reference signal, after receiving the third information on the second resource, the network device may determine the first reference signal associated with the second resource. In this case, the network device may perform link recovery based on the first reference signal.

Optionally, the method may further include S430.

S430. The network device sends fourth information, where the fourth information indicates link failure recovery response information. Correspondingly, the terminal device detects the fourth information in a first time period.

A start moment of the first time period may be after a sending moment of the third information.

For example, the start moment of the first time period may be an $m^{th}$ time unit after the sending moment of the third information. For another example, the start moment of the first time period may be an $n^{th}$ time-frequency resource, used to send a downlink control channel, after the sending moment of the third information. m and n are positive integers.

Optionally, the terminal device may detect the fourth information in the first time period based on the third information.

Optionally, the fourth information may be response information of the first information. Alternatively, the fourth information may be response information of the third information.

In this embodiment of this application, that the fourth information indicates link failure recovery response information may be understood as that the fourth information indicates the response information of the first information. Alternatively, the fourth information indicates the response information of the third information.

Optionally, the fourth information may be one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

Optionally, the fourth information may be a PDSCH or a PUSCH scheduled by using the DCI.

Optionally, when the fourth information is the PDSCH or the PUSCH, or is the quasi co-location QCL indication information of the first cell, the terminal device may send sixth information or fifth information by using an uplink resource for feeding back a HARQ. For example, if the terminal device detects the fourth information in the first time period, the terminal device may feed back an ACK, that is, the sixth information. If the terminal device does not detect the fourth information in the first time period, the terminal device may feed back a NACK, that is, the fifth information. After receiving the NACK information, the network device may resend the second information.

Optionally, the DCI in the preset format is DCI having a toggled new data indicator (New data indicator, NDI) field, and the NDI field is a field in the DCI. For example, if a state value of the NDI field in the DCI is 0 last time, and the state value of the NDI field in the DCI is 1 this time, it is considered that the data transmitted herein is newly transmitted data.

Optionally, the DCI in the preset format may be in a DCI format (format) 0-0, and an NDI field in the DCI format 0-0 needs to be toggled. Alternatively, the DCI in the preset format may be in a DCI format (format) 0-1, and an NDI field in the DCI format 0-1 needs to be toggled. Alternatively, the DCI in the preset format may be DCI in another format agreed on in advance. This is not limited in this embodiment of this application.

Particularly, when the second resource is a PUSCH resource, and the second resource is an aperiodic resource, the fourth information may be the DCI in the preset format. In this case, an NDI field of the DCI in the preset format is toggled.

In this embodiment of this application, optionally, the network device may send the fourth information to the terminal device by using a resource in the second cell. Alternatively, the network device may send the fourth information to the terminal device by using a resource in the first cell.

In this embodiment of this application, the fourth information may indicate the link failure recovery response information. When the terminal device receives the fourth information, the terminal device may consider that link recovery succeeds.

Optionally, when the terminal device detects the fourth information in the first time period, the terminal device may send the sixth information on the second resource, where the sixth information may indicate that link recovery succeeds.

Correspondingly, the network device may receive the sixth information on the second resource.

Optionally, when the second resource is a PRACH resource, the terminal device may send the fifth information by using the second resource, or may send the sixth information by using a third resource, where the third resource is different from the second resource.

After receiving the sixth information, the network device may determine that link recovery succeeds.

In this case, the network device and the terminal device may send a PDSCH, a PDCCH, a PUSCH, a PUCCH, an SRS, a CSI-RS, or the like based on the first reference signal. After the terminal device receives TCI information configured by the network device for the first cell, the network device and the terminal device may transmit a signal or a channel based on the TCI information.

In this embodiment of this application, when the terminal device does not detect the fourth information in the first time period, the terminal device may re-initiate link failure recovery. A process in which the terminal device re-initiates the link failure recovery to the network device is shown in FIG. 6 and FIG. 7.

In the communication method in this embodiment of this application, the terminal device may directly send the third information on the second resource that is preconfigured and/or that carries the fixed quantity of bits, and does not need to report a BSR to the network device. This can reduce a link recovery delay.

Figure 5:
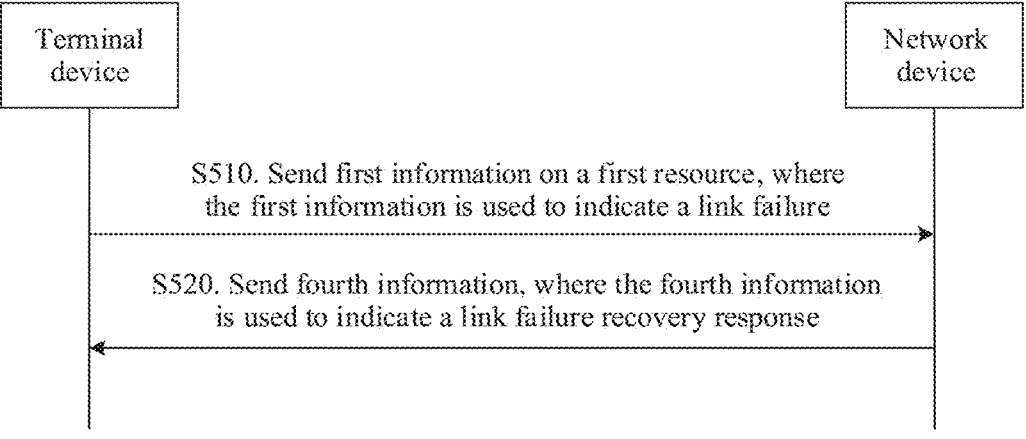
FIG. 5 is a schematic flowchart of a communication method according to another embodiment of this application.

FIG. 5 is a schematic flowchart of a communication method 500 according to another embodiment of this application. It should be understood that FIG. 5 shows steps or operations of the communication method. However, these steps or operations are merely examples. In this embodiment of this application, other operations or variations of the operations in FIG. 5 may be further performed, or not all steps need to be performed. Alternatively, these steps may be performed in other orders.

S510. A terminal device sends first information on a first resource, where the first information is used to indicate a link failure. Correspondingly, a network device receives the first information on the first resource.

The first resource may be a resource of the second cell, and the second cell is a cell different from the first cell, for example, a resource in a PCell.

Optionally, the first resource may be a resource used to carry an SR. Optionally, the first resource may be a resource dedicated to indicating the link failure.

Optionally, the first resource may be a physical random access channel PRACH resource or a physical uplink control channel PUCCH resource.

In this embodiment of this application, that the first information is used to indicate a link failure may be understood as that the first information is used to request fourth information, or the first information is request information of fourth information.

In this embodiment of this application, the first information may be link failure recovery request information, an SR, or link failure information. It should be understood that the first information is used to notify the network device of the link failure. The first information is not limited in this embodiment of this application, and the first information may alternatively be other information indicating the link failure to the network device.

Optionally, the method may further include S520.

S520. The network device sends fourth information, where the fourth information indicates link failure recovery response information. Correspondingly, the terminal device detects the fourth information in a first time period.

A start moment of the first time period may be after a sending moment of the first information.

For example, the start moment of the first time period may be an $m^{th}$ time unit after the sending moment of the first information. For another example, the start moment of the first time period may be an $n^{th}$ time-frequency resource, used to send a downlink control channel, after the sending moment of the first information. m and n are positive integers.

Optionally, before S520, the terminal device may determine a second resource, where the second resource may be a dynamic resource. For a method for determining the second resource herein, refer to the prior art. Details are not described herein again.

Optionally, the terminal device may send a first reference signal and/or the first cell on the second resource, where channel quality of the first reference signal may be greater than or equal to a preset threshold, and a link failure occurs in the first cell.

Alternatively, the terminal device may determine the second resource after S520. An execution sequence is not limited in the present invention.

In this embodiment of this application, that the fourth information indicates link failure recovery response information may be understood as that the fourth information indicates response information of the first information.

Optionally, the fourth information may be one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

Optionally, the fourth information may be MAC-CE signaling or RRC signaling, and is used to indicate QCL information of a PDCCH or a PDSCH of the first cell.

Optionally, the fourth information may be a PDSCH or a PUSCH scheduled by using the DCI.

Optionally, when the fourth information is the PDSCH or the PUSCH, or is the quasi co-location QCL indication information of the first cell, the terminal device may send sixth information or fifth information by using an uplink resource for feeding back a HARQ. For example, if the terminal device detects the fourth information in the first time period, the terminal device may feed back an ACK, that is, the sixth information. If the terminal device does not detect the fourth information in the first time period, the terminal device may feed back a NACK, that is, the fifth information. Optionally, the DCI in the preset format is DCI having a toggled new data indicator (New data indicator, NDI) field, and the NDI field is a field in the DCI. For example, if a state value of the NDI field in the DCI is 0 last time, and the state value of the NDI field in the DCI is 1 this time, it is considered that the data transmitted herein is newly transmitted data.

Optionally, the DCI in the preset format may be in a DCI format (format) 0-0, and an NDI field in the DCI format 0-0 needs to be toggled. Alternatively, the DCI in the preset format may be in a DCI format (format) 0-1, and an NDI field in the DCI format 0-1 needs to be toggled. Alternatively, the DCI in the preset format may be DCI in another format agreed on in advance. This is not limited in this embodiment of this application.

Particularly, when the second resource is a PUSCH resource, and the second resource is an aperiodic resource, the fourth information may be the DCI in the preset format. In this case, an NDI field of the DCI in the preset format is toggled.

In this embodiment of this application, optionally, the network device may send the fourth information to the terminal device by using a resource in the second cell. Alternatively, the network device may send the fourth information to the terminal device by using a resource in the first cell.

Optionally, after link recovery succeeds, the terminal device may send the sixth information on the second resource, where the sixth information indicates that link recovery succeeds.

Correspondingly, the network device may receive the sixth information on the second resource.

Optionally, when the second resource is a PRACH resource, the terminal device may send the fifth information by using the second resource, or may send the sixth information by using a third resource, where the third resource is different from the second resource.

After receiving the sixth information, the network device may determine that link recovery succeeds.

In this case, the network device and the terminal device may send a PDSCH, a PDCCH, a PUSCH, a PUCCH, an SRS, a CSI-RS, or the like based on the first reference signal. After the terminal device receives TCI information configured by the network device for the first cell, the network device and the terminal device may transmit a signal or a channel based on the TCI information.

In this embodiment of this application, when the terminal device does not detect the fourth information in the first time period, the terminal device may re-initiate link failure recovery. A process in which the terminal device re-initiates the link failure recovery to the network device is shown in FIG. 6 and FIG. 7.

In the prior art, the link failure recovery request information is sent only once. If the information fails to be sent or a link cannot be recovered by sending the information, reliability of link failure recovery cannot be ensured. In the embodiments of this application, when the terminal device does not detect the fourth information in the first time period, the terminal device may retransmit the first information and/or the third information (or the fifth information) by using methods in FIG. 6 and FIG. 7, to re-initiate link failure recovery. This can ensure the reliability of link recovery and improve a success rate of link recovery. The following provides detailed descriptions with reference to FIG. 6 and FIG. 7.

FIG. 6 is a schematic flowchart of a communication method 600 according to another embodiment of this application. It should be understood that FIG. 6 shows steps or operations of the communication method. However, these steps or operations are merely examples. In this embodiment of this application, other operations or variations of the operations in FIG. 6 may be further performed, or not all steps need to be performed. Alternatively, these steps may be performed in other orders.

S610. A terminal device sends first information on a first resource, where the first information is used to indicate a link failure. Correspondingly, a network device receives the first information on the first resource.

Optionally, when fourth information is not detected in a first time period, the terminal device may send the first information on the first resource. A start moment of the first time period may be after a sending moment of third information.

In this embodiment of this application, the terminal device resends the first information when the terminal device does not receive the fourth information. This can ensure reliability of link failure recovery.

Optionally, the start moment of the first time period may be an $m^{th}$ time unit after the sending moment of the third information. Alternatively, the start moment of the first time period may be an $n^{th}$ time-frequency resource, used to send a downlink control channel, after the sending moment of the third information. m and n are positive integers.

For example, the first time period may be understood as a timer 1, and the timer 1 may start timing in the $m^{th}$ time unit after the sending moment of the third information; or the timer 1 may start timing on the $n^{th}$ time-frequency resource, used to send the downlink control channel, after the sending moment of the third information. If the fourth information is not detected when the timer 1 expires, the terminal device may send the first information on the first resource.

Optionally, if the terminal device does not receive second information within a preset time period, the terminal device may resend the first information.

Optionally, if the terminal device receives second information within a preset time period, the terminal device may send fifth information. The preset time period may also be implemented by using a timer, and details are not described herein.

Optionally, the fifth information may be used to indicate a second reference signal. Optionally, channel quality of the second reference signal is greater than or equal to a preset threshold. After receiving the fifth information, the network device may perform link recovery based on the second reference signal. Alternatively, the fifth information may be used to indicate a first cell, where the first cell is a cell in which a link failure occurs, and after receiving the fifth information, the network device may perform link recovery on the first cell. Alternatively, the fifth information may indicate both the second reference signal and the first cell. For example, after receiving the third information, the network device may recover a link of the first cell based on a first reference signal. Optionally, the second reference signal is a reference signal in a reference signal set dedicated to link recovery. Alternatively, the second reference signal may be a reference signal in a reference signal set used in a beam management or beam training process.

Optionally, link failure recovery request information may be the third information and/or the fifth information. In other words, if the terminal device still does not detect the fourth information in the first time period after sending the fifth information, the terminal device may send one or more pieces of the link failure recovery request information. Reference signals indicated by the one or more pieces of the link failure recovery request information that are continued to be sent may be different. Alternatively, reference signals indicated by the one or more pieces of the link failure recovery request information that are continued to be sent may be the same. This is not limited in this embodiment of this application.

Correspondingly, after receiving the link failure recovery request information, the network device may send the fourth information.

Optionally, before S610, the terminal device may identify, for the first cell, the second reference signal whose channel quality is greater than or equal to the preset threshold.

It should be understood that for steps that need to be performed between S610 and S620, refer to FIG. 3, FIG. 4, or FIG. 5. Details are not described herein again. For example, S320 and/or S330 in the communication method 300 in FIG. 3 may be further performed between S610 and S620. In this case, if the second resource is an aperiodic resource scheduled by using DCI signaling, resource overheads can be effectively reduced. Alternatively, S420 in the communication method 400 in FIG. 4 may be performed between S610 and S620.

S620. The network device sends the fourth information. Correspondingly, the terminal device detects the fourth information.

It should be understood that, in this application, detection may also be understood as receiving. For example, that the terminal device detects the fourth information may also be described as that the terminal device receives the fourth information.

Optionally, when the terminal device does not detect the fourth information in the first time period and/or a second time period, the following steps may be performed; or when the terminal device detects the fourth information in the first time period, step 630 may be performed.

Optionally, when the fourth information indicates a PDSCH or a PUSCH, or is quasi co-location QCL indication information of the first cell, the terminal device may send the link failure recovery request information by using an uplink resource for feeding back a HARQ. For example, if the terminal device does not detect the fourth information in the first time period, the terminal device may feed back a NACK, that is, the link failure recovery request information.

In this case, if the terminal device does not detect the fourth information in the first time period, the terminal device may re-initiate link failure recovery.

For example, if the terminal device still does not detect the fourth information in the first time period after sending the link failure recovery request information, the terminal device may continue to send the first information. In this case, for a step of resending the link failure recovery request by the terminal device, refer to FIG. 3, FIG. 4, or FIG. 5. Details are not described herein again.

Optionally, when a quantity of times that the terminal device sends the first information reaches a preset quantity of times, the terminal device may determine that link recovery fails. It may also be understood as: when the quantity of times of sending the first information reaches the preset quantity of times, and the terminal device does not receive the second information, the terminal device may determine that link recovery fails. Alternatively, it may be understood as: when a quantity of times of sending the first information reaches a preset quantity of times, and the terminal device does not receive the fourth information, the terminal device may determine that link recovery fails. Alternatively, it may be understood as: when a quantity of times of sending the first information reaches a preset quantity of times, and the terminal device does not receive the second information and the fourth information, the terminal device may determine that link recovery fails.

For another example, if the terminal device still does not detect the fourth information in the first time period after sending the link failure recovery request information, the terminal device may continue to send the one or more pieces of the link failure recovery request information. Reference signals indicated by the one or more pieces of the link failure recovery request information that are continued to be sent may be different. Alternatively, reference signals indicated by the one or more pieces of the link failure recovery request information that are continued to be sent may be the same. This is not limited in this embodiment of this application. In this case, for a step of resending the link failure recovery request by the terminal device, refer to FIG. 3 or FIG. 4. Details are not described herein again.

In this embodiment of this application, if the terminal device does not detect the fourth information in the second time period, the terminal device may determine that link recovery fails.

For example, when the fourth information is not detected in the second time period, the terminal device may determine that link recovery fails. A start moment of the second time period is after a sending moment of the first information or the third information, or when or after it is determined that a link failure occurs in the first cell, duration of the second time period is greater than duration of the first time period.

Optionally, the start moment of the second time period may be a $p^{th}$ time unit after the sending moment of the first information or the third information. p is a positive integer.

For example, the second time period may be understood as a timer 2, and the timer 2 may start timing in the $p^{th}$ time unit after the first information or the third information is sent. If the fourth information is not detected when the timer 2 expires, the terminal device may determine that link recovery fails. In this case, the terminal device may deactivate the second resource.

Correspondingly, in this embodiment of this application, if the quantity of times that the network device sends the fourth information reaches the preset quantity of times, the network device may determine that link recovery fails.

Optionally, when determining that link recovery fails, the network device may deactivate the second resource.

S630. The terminal device sends sixth information, where the sixth information indicates that link recovery succeeds. Correspondingly, the network device receives the sixth information.

Optionally, after receiving the sixth information, the network device may determine that link recovery succeeds.

In this case, the network device and the terminal device may send a PDSCH, a PDCCH, a PUSCH, a PUCCH, an SRS, a CSI-RS, or the like based on the first reference signal. After the terminal device receives TCI information configured by the network device for the first cell, the network device and the terminal device may transmit a signal or a channel based on the TCI information.

In this embodiment of this application, when detecting the fourth information in the first time period, the terminal device may send the sixth information on the second resource. Correspondingly, the network device may receive the sixth information on the second resource.

Optionally, when the fourth information indicates a PDSCH or a PUSCH, or is quasi co-location QCL indication information of the first cell, the terminal device may send the sixth information by using an uplink resource for feeding back a HARQ. For example, if the terminal device detects the fourth information in the first time period, the terminal device may feed back an ACK, that is, the sixth information.

Optionally, when detecting the fourth information, the terminal device may deactivate (deactivation/deactivate) the second resource. Alternatively, after sending the sixth information, the terminal device may deactivate the second resource. It should be understood that, in this embodiment of this application, deactivation may also be understood as releasing (release). For example, deactivating the second resource may also be referred to as releasing the second resource.

Optionally, when receiving the sixth information, the network device may deactivate the second resource.

Optionally, when the sixth information is not received in the second time period or a third time period, the network device may determine that link recovery fails. A start moment of the third time period may be after a sending moment of the fourth information.

Optionally, the start moment of the third time period may be a $q^{th}$ time unit after a sending moment of the fourth information. q is a positive integer.

For example, the third time period may be understood as a timer 3. The timer 3 may start timing in the $q^{th}$ time unit after the sending moment of the fourth information. If the sixth information is not detected when the timer 3 expires, the network device may determine that link recovery fails. In this case, the network device may deactivate the second resource.

In this embodiment of this application, when the fourth information is not detected in the first time period, the terminal device sends the first information to the network device to re-apply for a resource for link recovery, instead of using a periodic resource. This can reduce resource overheads.

FIG. 7 is a schematic flowchart of a communication method 700 according to another embodiment of this application. It should be understood that FIG. 7 shows steps or operations of the communication method. However, these steps or operations are merely examples. In this embodiment of this application, other operations or variations of the operations in FIG. 7 may be further performed, or not all steps need to be performed. Alternatively, these steps may be performed in other orders.

S710. A terminal device sends link failure recovery request information on a second resource. Correspondingly, a network device receives the link failure recovery request information on the second resource.

The link failure recovery request information may be third information and/or fifth information.

Optionally, when fourth information indicates a PDSCH or a PUSCH, or is quasi co-location QCL indication information of a first cell, the terminal device may send the link failure recovery request information by using an uplink resource for feeding back a HARQ. For example, if the terminal device does not detect the fourth information in a first time period, the terminal device may feed back a NACK, that is, the link failure recovery request information.

Optionally, the link failure recovery request information may be used to indicate a second reference signal. After receiving the link failure recovery request information, the network device may perform link recovery based on the second reference signal. Alternatively, the link failure recovery request information may be used to indicate the first cell. The first cell is a cell in which a link failure occurs. After receiving the link failure recovery request information, the network device may perform link recovery on the first cell. Alternatively, the link failure recovery request information may indicate both the second reference signal and the first cell. For example, after receiving the third information, the network device may recover a link of the first cell based on a first reference signal. Optionally, the second reference signal is a reference signal in a reference signal set dedicated to link recovery. Alternatively, the second reference signal may be a reference signal in a reference signal set used in a beam management or beam training process.

Optionally, the second resource may be a semi-persistent (semi-persistent) resource. Optionally, sending of the link failure recovery request information does not need to be scheduled by using second information each time. This can reduce a link recovery delay. For example, if the link failure recovery request information (for example, the third information or fifth information) needs to be retransmitted, the terminal device may no longer send first information nor wait for the second information, but directly send the link failure recovery request information on the second resource. The method can reduce the link failure recovery delay. Optionally, the second resource may be a semi-persistent resource or a persistent resource associated with the first information, or a semi-persistent resource or a persistent resource associated with a first resource carrying the first information. The resource may be a resource configured by using RRC signaling or MAC-CE signaling.

Optionally, if the terminal device does not detect the fourth information in the first time period, the terminal device may send the link failure recovery request information on the second resource. Correspondingly, the network device receives the link failure recovery request information on the second resource. A start moment of the first time period may be after a sending moment of the third information.

Optionally, the start moment of the first time period may be an $m^{th}$ time unit after the sending moment of the third information. Alternatively, the start moment of the first time period may be an $n^{th}$ time-frequency resource, used to send a downlink control channel, after the sending moment of the third information. m and n are positive integers.

For example, the first time period may be understood as a timer 1, and the timer 1 may start timing in the $m^{th}$ time unit after the sending moment of the third information; or the timer 1 may start timing on the $n^{th}$ time-frequency resource, used to send the downlink control channel, after the sending moment of the third information. If the fourth information is not detected when the timer 1 expires, the terminal device may send the first information on the first resource.

Optionally, before S710, the terminal device may identify, for the first cell, the second reference signal whose channel quality is greater than or equal to a preset threshold.

In this embodiment of this application, after receiving the link failure recovery request information, the network device may send the fourth information.

S720. The network device sends the fourth information. Correspondingly, the terminal device detects the fourth information.

It should be understood that, in this application, detection may also be understood as receiving. For example, that the terminal device detects the fourth information may also be described as that the terminal device receives the fourth information.

Optionally, when the terminal device does not detect the fourth information in the first time period or a second time period, the following steps may be performed; or when the terminal device detects the fourth information in the first time period, step 730 may be performed.

In this case, if the terminal device does not detect the fourth information in the first time period, the terminal device may resend the link failure recovery request.

For example, if the terminal device still does not detect the fourth information in the first time period after sending the link failure recovery request information, the terminal device may continue to send the link failure recovery request information. In this case, the terminal device performs the step of S710 to resend the link failure recovery request. Details are not described herein again.

Optionally, when a quantity of times that the terminal device sends the link failure recovery request information reaches a preset quantity of times, the terminal device may determine that link recovery fails. For example, when the quantity of times of sending the link failure recovery request information reaches the preset quantity of times, and the terminal device does not receive the second information, the terminal device may determine that link recovery fails; or when the quantity of times of sending the link failure recovery request information reaches the preset quantity of times, and the terminal device does not receive the fourth information, the terminal device may determine that link recovery fails.

For another example, if the terminal device still does not detect the fourth information in the first time period after sending the link failure recovery request information, the terminal device may continue to send one or more pieces of the link failure recovery request information. Reference signals indicated by the one or more pieces of the link failure recovery request information that are continued to be sent may be different. Alternatively, reference signals indicated by the one or more pieces of the link failure recovery request information that are continued to be sent may be the same. This is not limited in this embodiment of this application. In this case, the terminal device performs the step of S710 to resend the link failure recovery request. Alternatively, the terminal device may resend the first information according to the method in FIG. 6. Details are not described herein again.

In this embodiment of this application, if the terminal device does not detect the fourth information in the second time period, the terminal device may determine that link recovery fails.

For example, when the fourth information is not detected in the second time period, the terminal device may determine that link recovery fails. A start moment of the second time period is after a sending moment of the first information or the third information, or when or after it is determined that a link failure occurs in the first cell, duration of the second time period is greater than duration of the first time period.

Optionally, the start moment of the second time period may be a $p^{th}$ time unit after the sending moment of the first information or the third information. p is a positive integer.

For example, the second time period may be understood as a timer 2, and the timer 2 may start timing in the $p^{th}$ time unit after the first information or the third information is sent. If the fourth information is not detected when the timer 2 expires, the terminal device may determine that link recovery fails. In this case, the terminal device may deactivate the second resource.

Correspondingly, in this embodiment of this application, if the quantity of times that the network device sends the fourth information reaches the preset quantity of times, the network device may determine that link recovery fails.

Optionally, when determining that link recovery fails, the network device may deactivate the second resource.

S730. The terminal device sends sixth information, where the sixth information indicates that link recovery succeeds. Correspondingly, the network device receives the sixth information.

Optionally, after receiving the sixth information, the network device may determine that link recovery succeeds.

In this case, the network device and the terminal device may send a PDSCH, a PDCCH, a PUSCH, a PUCCH, an SRS, a CSI-RS, or the like based on the first reference signal. When the terminal device receives TCI information configured by the network device for the first cell, the network device and the terminal device may transmit a signal or a channel based on the TCI information.

In this embodiment of this application, when detecting the fourth information in the first time period, the terminal device may send the sixth information on the second resource. Correspondingly, the network device may receive the sixth information on the second resource.

Optionally, when the fourth information indicates a PDSCH or a PUSCH, or is quasi co-location QCL indication information of the first cell, the terminal device may send the sixth information by using an uplink resource for feeding back a HARQ. For example, if the terminal device detects the fourth information in the first time period, the terminal device may feed back an ACK, that is, the sixth information.

Optionally, when detecting the fourth information, the terminal device may deactivate (deactivation/deactivate) the second resource. Alternatively, after sending the sixth information, the terminal device may deactivate the second resource. It should be understood that, in this embodiment of this application, deactivation may also be understood as releasing (release). For example, deactivating the second resource may also be referred to as releasing the second resource. Optionally, when receiving the sixth information, the network device may deactivate the second resource.

Optionally, when receiving the sixth information, the network device may deactivate the second resource.

Optionally, when the sixth information is not received in the second time period or a third time period, the network device may determine that link recovery fails. A start moment of the third time period may be after a sending moment of the fourth information.

Optionally, the start moment of the third time period may be a $q^{th}$ time unit after a sending moment of the fourth information. q is a positive integer.

For example, the third time period may be understood as a timer 3. The timer 3 may start timing in the $q^{th}$ time unit after the sending moment of the fourth information. If the sixth information is not detected when the timer 3 expires, the network device may determine that link recovery fails. In this case, the network device may deactivate the second resource.

In this embodiment of this application, when the fourth information is not detected in the first time period, the terminal device sends the link failure recovery request information on the second resource, and does not need to re-apply for a resource from the network device. This can reduce a link failure recovery delay.

Figure 8:
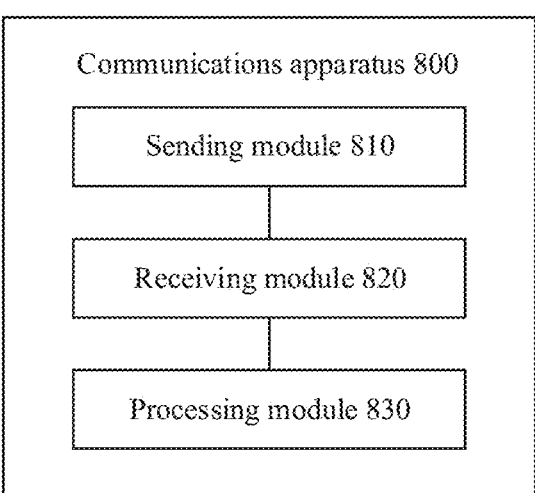
FIG. 8 is a schematic structural diagram of a communications apparatus according to an embodiment of this application.

FIG. 8 is a schematic block diagram of a communications apparatus 800 according to an embodiment of this application. It should be understood that the communications apparatus 800 is merely an example. The communications apparatus in this embodiment of this application may further include other modules or units, may include modules having functions similar to those of the modules in FIG. 8, or may not necessarily include all the modules in FIG. 8.

A sending module 810 is configured to send first information on a first resource, where the first information is used to indicate a link failure.

A receiving module 820 is configured to receive second information, where the second information is used to indicate a second resource.

The sending module 810 is further configured to send third information on the second resource based on the second information, where the third information is used to indicate a first reference signal and/or a first cell, and when channel quality of the first reference signal is greater than or equal to a preset threshold, the link failure occurs in the first cell.

Optionally, the second resource is a preconfigured resource and/or the second resource is a resource carrying a fixed quantity of bits.

Optionally, the second information is one of the following: downlink control information DCI in a dedicated search space, DCI scrambled by using a dedicated radio network temporary identifier RNTI, or DCI including a preset state value.

Optionally, the receiving module 820 is further configured to detect fourth information in a first time period based on the third information, where the fourth information indicates link failure recovery response information, and a start moment of the first time period is after a sending moment of the third information.

Optionally, the fourth information is one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

Optionally, the sending module 810 is further configured to: when the fourth information is not detected in the first time period, send fifth information on the second resource, where the fifth information indicates a second reference signal and/or the first cell, and channel quality of the second reference signal is greater than or equal to the preset threshold.

Optionally, the sending module 810 is further configured to: when the fourth information is detected in the first time period, send sixth information, where the sixth information indicates that link recovery succeeds.

Optionally, the third information and/or the fifth information is link failure recovery request information, and the sending module 810 is further configured to: continue to send one or more pieces of the link failure recovery request information; and the apparatus further includes a processing module 830, configured to: when a quantity of times of sending the link failure recovery request information reaches a preset quantity of times, determine that link recovery fails.

Optionally, the sending module 810 is further configured to: when the fourth information is not detected in the first time period, send the first information on the first resource, where the first information is used to indicate the link failure.

Optionally, the processing module 830 is further configured to: when a quantity of times of sending the first information reaches a preset quantity of times, determine that link recovery fails.

Optionally, the processing module 830 is further configured to: when the fourth information is not detected in a second time period, determine that link recovery fails, where a start moment of the second time period is after the sending moment of the third information, and duration of the second time period is greater than duration of the first time period.

Optionally, the second resource is a semi-persistent resource.

Optionally, the processing module 830 is further configured to: when the fourth information is detected or when the sixth information is sent, deactivate the second resource; or when determining that link recovery fails, deactivate the second resource.

Optionally, the first resource is a physical random access channel PRACH resource or a physical uplink control channel PUCCH resource.

Optionally, the second resource is a PRACH resource or a physical uplink shared channel PUSCH resource.

Figure 9:
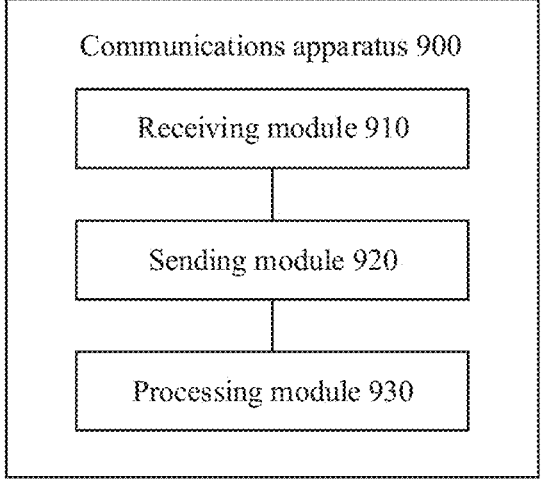
FIG. 9 is a schematic structural diagram of a communications apparatus according to another embodiment of this application.

FIG. 9 is a schematic block diagram of a communications apparatus 900 according to an embodiment of this application. It should be understood that the communications apparatus 900 is merely an example. The communications apparatus in this embodiment of this application may further include other modules or units, may include modules having functions similar to those of the modules in FIG. 9, or may not necessarily include all the modules in FIG. 9.

A receiving module 910 is configured to receive first information on a first resource, where the first information is used to indicate a link failure.

A sending module 920 is configured to send second information, where the second information is used to indicate a second resource.

The receiving module 910 is further configured to receive third information on the second resource based on the second information, where the third information is used to indicate a first reference signal and/or a first cell, and when channel quality of the first reference signal is greater than or equal to a preset threshold, the link failure occurs in the first cell.

Optionally, the second resource is a preconfigured resource and/or the second resource is a resource carrying a fixed quantity of bits.

Optionally, the second information is one of the following: downlink control information DCI in a dedicated search space, DCI scrambled by using a dedicated RNTI, or DCI including a preset state value.

Optionally, the sending module 920 is further configured to send fourth information, where the fourth information indicates link failure recovery response information.

Optionally, the fourth information is one of the following information: DCI scrambled by using a cell radio network temporary identifier C-RNTI, DCI scrambled by using a modulation and coding scheme cell specific radio network temporary identifier MCS-C-RNTI, the downlink control information DCI in the dedicated search space, the DCI scrambled by using the dedicated radio network temporary identifier RNTI, DCI scrambled by using a random access radio network temporary identifier RA-RNTI, the DCI including the preset state value, DCI including transmission configuration indicator TCI information, quasi co-location QCL indication information of the first cell, or DCI in a preset format, where the DCI in the preset format indicates newly transmitted data.

Optionally, the receiving module 910 is further configured to receive fifth information on the second resource, where the fifth information indicates a second reference signal and/or the first cell, and channel quality of the second reference signal is greater than or equal to the preset threshold.

Optionally, the receiving module 910 is further configured to receive sixth information, where the sixth information indicates that link recovery succeeds.

Optionally, the third information and/or the fifth information is link failure recovery request information, and the sending module 920 is further configured to: when the link failure recovery request information is received, continue to send the fourth information; and the apparatus further includes a processing module 930, configured to: when a quantity of times of sending the fourth information reaches a preset quantity of times and/or the sixth information is not received in a third time period, determine that link recovery fails, where a start moment of the third time period is after a sending moment of the fourth information.

Optionally, the receiving module 910 is further configured to receive the first information on the first resource, where the first information is used to indicate the link failure.

Optionally, the processing module 930 is further configured to: when a quantity of times of receiving the first information reaches a preset quantity of times, determine that link recovery fails.

Optionally, the second resource is a semi-persistent resource.

Optionally, the processing module 930 is further configured to: when the sixth information is received, deactivate the second resource; or when determining that link recovery fails, deactivate the second resource.

Optionally, the first resource is a physical random access channel PRACH resource or a physical uplink control channel PUCCH resource.

Optionally, the second resource is a PRACH resource or a physical uplink shared channel PUSCH resource.

Figure 10:
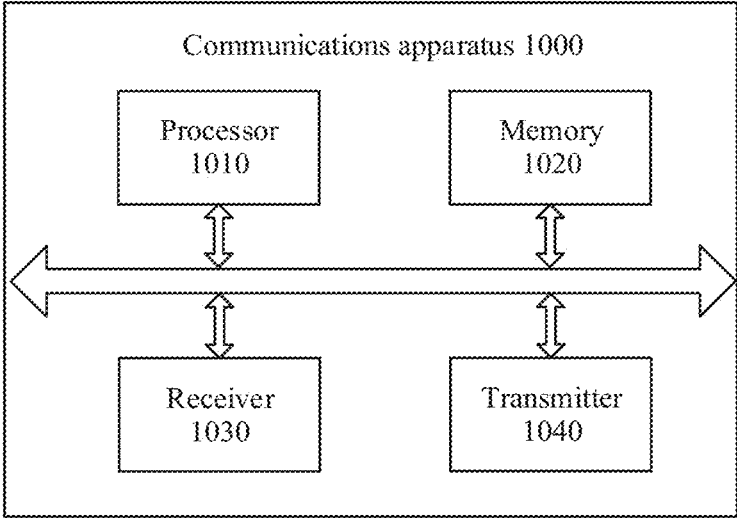
FIG. 10 is a schematic structural diagram of a communications apparatus according to another embodiment of this application.

FIG. 10 is a schematic structural diagram of a communications apparatus 1000 according to an embodiment of this application. It should be understood that the communications apparatus 1000 shown in FIG. 10 is merely an example. The communications apparatus 1000 in this embodiment of this application may further include other modules or units, or may include modules having functions similar to those of the modules in FIG. 10.

The communications apparatus 1000 may include one or more processors 1010, one or more memories 1020, a receiver 1030, and a transmitter 1040. The receiver 1030 and the transmitter 1040 may be integrated together and referred to as a transceiver. The memory 1020 is configured to store program code executed by the processor 1010. The memory 1020 may be integrated into the processor 1010, or the processor 1010 is coupled to the one or more memories 1020, to invoke an instruction in the memory 1020.

In an embodiment, the transmitter 1040 may be configured to implement operations or steps that can be implemented by the sending module 810 in FIG. 8, the receiver 1030 may be configured to implement operations or steps that can be implemented by the receiving module 820 in FIG. 8, and the processor 1010 may be configured to implement operations or steps that can be implemented by the processing module 830 in FIG. 8.

In an embodiment, the receiver 1030 may be configured to implement operations or steps that can be implemented by the receiving module 910 in FIG. 9, the transmitter 1040 may be configured to implement operations or steps that can be implemented by the sending module 920 in FIG. 9, and the processor 1010 may be configured to implement operations or steps that can be implemented by the processing module 830 in FIG. 8.

It should be understood that, the processor in the embodiments of this application may be a central processing unit (central processing unit, CPU). The processor may alternatively be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It may be understood that the memory in the embodiments of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. As examples rather than limitative descriptions, random access memories (random access memory, RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and may indicate three relationships. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint of the technical solutions. A person skilled in the art may use a different method to implement a described function for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units, and may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium such as a USB flash drive, a removable hard disk, a read-only memory (read-only memory, ROM), a random access memory (random access memory, RAM), a magnetic disk, or an optical disc, that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising: sending, by a terminal device, first information on a first resource, wherein the first information indicates a link failure;

receiving, by the terminal device, second information, wherein the second information indicates a second resource, and wherein the second information comprises at least one of downlink control information (DCI) in a dedicated search space or DCI scrambled by a dedicated radio network temporary identifier (RNTI);

sending, by the terminal device, third information on the second resource based on the second information, wherein the third information indicates at least one of a first reference signal or a first cell, and wherein when channel quality of the first reference signal is greater than or equal to a preset threshold, the link failure occurs in the first cell;

detecting, by the terminal device and based on the third information, fourth information indicating link failure recovery response information; in response to detecting the fourth information, deactivating, by the terminal device, the second resource; and determining that the first reference signal is available based on determining that the fourth information is received using a QCL (quasi co-location)-TypeD spatial receive parameter corresponding to the first reference signal.

2. The method according to claim 1, wherein the fourth information is detected in a first time period, wherein a start moment of the first time period is after a sending moment of the third information.

3. The method according to claim 2, wherein the fourth information is one of the following information:

DCI scrambled by using a cell radio network temporary identifier (C-RNTI), DCI scrambled by using a modulation and coding scheme cell specific radio network temporary identifier (MCS-C-RNTI), DCI in a dedicated search space, DCI scrambled by using a dedicated RNTI, DCI scrambled by using a random access radio network temporary identifier (RA-RNTI), DCI comprising a preset state value, DCI comprising transmission configuration indicator (TCI) information, quasi co-location (QCL) indication information of the first cell, or DCI in a preset format, wherein the DCI in the preset format indicates newly transmitted data.

4. The method according to claim 3, wherein the DCI in the preset format is DCI having a toggled new data indicator (NDI) field, and wherein the toggled NDI field is a field in the DCI.

5. The method according to claim 2, wherein the method further comprises:

after the fourth information is received, receiving a physical downlink control channel (PDCCH) or sending a physical uplink control channel (PUCCH) based on the first reference signal.

6. A communication method, comprising:

receiving, by a network device, first information on a first resource, wherein the first information indicates a link failure;

sending, by the network device, second information to a terminal device, wherein the second information indicates a second resource, and wherein the second information comprises at least one of downlink control information (DCI) in a dedicated search space or DCI scrambled by a dedicated radio network temporary identifier (RNTI);

receiving, by the network device, third information on the second resource based on the second information, wherein the third information indicates at least one of a first reference signal or a first cell, and wherein when channel quality of the first reference signal is greater than or equal to a preset threshold, the link failure occurs in the first cell;

sending, by the network device to the terminal device, fourth information indicating link failure recovery response information, wherein whether the fourth information is received using a QCL (quasi co-location)-TypeD spatial receive parameter corresponding to the first reference signal indicates whether the first reference signal is available when the fourth information is received by the terminal device; and deactivating, by the network device, the second resource.

7. The method according to claim 6, wherein the fourth information is one of the following information:

DCI scrambled by using a cell radio network temporary identifier (C-RNTI), DCI scrambled by using a modulation and coding scheme cell specific radio network temporary identifier (MCS-C-RNTI), DCI in a dedicated search space, DCI scrambled by using a dedicated RNTI, DCI scrambled by using a random access radio network temporary identifier (RA-RNTI), DCI comprising a preset state value, DCI comprising transmission configuration indicator (TCI) information, quasi co-location (QCL) indication information of the first cell, or DCI in a preset format, wherein the DCI in the preset format indicates newly transmitted data.

8. The method according to claim 7, wherein the DCI in the preset format is DCI having a toggled new data indicator (NDI) field, and wherein the toggled NDI field is a field in the DCI.

9. The method according to claim 6, wherein the method further comprises:

after the fourth information is sent, sending a physical downlink control channel (PDCCH) or receiving a physical uplink control channel (PUCCH) based on the first reference signal.

10. A communications apparatus, comprising: a transmitter;

a receiver;

at least one processor; and one or more memories coupled to the at least one processor and storing programming instructions for execution by the at least one processor to:

send, by the transmitter, first information on a first resource, wherein the first information indicates a link failure;

receive, by the receiver, second information, wherein the second information indicates a second resource, and wherein the second information comprises at least one of downlink control information (DCI) in a dedicated search space or DCI scrambled by a dedicated radio network temporary identifier (RNTI); send, by the transmitter, third information on the second resource based on the second information, wherein the third information indicates at least one of a first reference signal or a first cell, and wherein when channel quality of the first reference signal is greater than or equal to a preset threshold, the link failure occurs in the first cell;

detect, based on the third information, fourth information indicating link failure recovery response information;

in response to detecting the fourth information, deactivate the second resource; and determine that the first reference signal is available based on determining that the fourth information is received using a QCL (quasi co-location)-TypeD spatial receive parameter corresponding to the first reference signal.

11. The apparatus according to claim 10, wherein the fourth information is detected in a first time period, wherein a start moment of the first time period is after a sending moment of the third information.

12. The apparatus according to claim 11, wherein the fourth information is one of the following information:

DCI scrambled by using a cell radio network temporary identifier (C-RNTI), DCI scrambled by using a modulation and coding scheme cell specific radio network temporary identifier (MCS-C-RNTI), DCI in a dedicated search space, DCI scrambled by using a dedicated RNTI, DCI scrambled by using a random access radio network temporary identifier (RA-RNTI), DCI comprising a preset state value, DCI comprising transmission configuration indicator (TCI) information, quasi co-location (QCL) indication information of the first cell, or DCI in a preset format, wherein the DCI in the preset format indicates newly transmitted data.

13. The apparatus according to claim 12, wherein the DCI in the preset format is DCI having a toggled new data indicator (NDI) field, and wherein the toggled NDI field is a field in the DCI.

14. The apparatus according to claim 11, wherein the programming instructions are for execution by the at least one processor to:

after the fourth information is received, receive, by the receiver, a physical downlink control channel (PDCCH) based on the first reference signal; or after the fourth information is received, send, by the transmitter, a physical uplink control channel (PUCCH) based on the first reference signal.

15. A communications apparatus, comprising:

a receiver;

a transmitter;

at least one processor; and one or more memories coupled to the at least one processor and storing programming instructions for execution by the at least one processor to:

receive, by the receiver, first information on a first resource, wherein the first information indicates a link failure;

send, by the transmitter, second information, wherein the second information indicates a second resource, and wherein the second information comprises at least one of downlink control information (DCI) in a dedicated search space or DCI scrambled by a dedicated radio network temporary identifier (RNTI);

receive, by the receiver, third information on the second resource based on the second information, wherein the third information indicates at least one of a first reference signal or a first cell, and wherein when channel quality of the first reference signal is greater than or equal to a preset threshold, the link failure occurs in the first cell;

send, to a terminal device, fourth information indicating link failure recovery response information, wherein whether the fourth information is received using a QCL (quasi co-location)-TypeD spatial receive parameter corresponding to the first reference signal indicates whether the first reference signal is available when the fourth information is received by the terminal device; and deactivate the second resource.

16. The apparatus according to claim 15, wherein the fourth information is one of the following information:

DCI scrambled by using a cell radio network temporary identifier (C-RNTI), DCI scrambled by using a modulation and coding scheme cell specific radio network temporary identifier (MCS-C-RNTI), DCI in a dedicated search space, DCI scrambled by using a dedicated RNTI, DCI scrambled by using a random access radio network temporary identifier (RA-RNTI), DCI comprising a preset state value, DCI comprising transmission configuration indicator (TCI) information, quasi co-location (QCL) indication information of the first cell, or DCI in a preset format, wherein the DCI in the preset format indicates newly transmitted data.

17. The apparatus according to claim 16, wherein the DCI in the preset format is DCI having a toggled new data indicator (NDI) field, and wherein the toggled NDI field is a field in the DCI.

18. The apparatus according to claim 15, wherein the programming instructions are for execution by the at least one processor to:

after the fourth information is sent, send, by the transmitter, a physical downlink control channel (PDCCH) based on the first reference signal; or after the fourth information is sent, receive, by the receiver, a physical uplink control channel (PUCCH) based on the first reference signal.

19. A non-transitory computer-readable storage medium storing programming instructions for execution by at least one processor, that when executed by the at least one processor, cause a computer to perform operations comprising:

sending, by a terminal device, first information on a first resource, wherein the first information indicates a link failure;

receiving, by the terminal device, second information, wherein the second information indicates a second resource, and wherein the second information comprises at least one of downlink control information (DCI) in a dedicated search space or DCI scrambled by a dedicated radio network temporary identifier (RNTI);

sending, by the terminal device, third information on the second resource based on the second information, wherein the third information indicates at least one of a first reference signal or a first cell, and wherein when channel quality of the first reference signal is greater than or equal to a preset threshold, the link failure occurs in the first cell;

detecting, by the terminal device and based on the third information, fourth information indicating link failure recovery response information; in response to detecting the fourth information, deactivating, by the terminal device, the second resource; and determining that the first reference signal is available based on detecting determining that the fourth information is received using a QCL (quasi co-location)-TypeD spatial receive parameter corresponding to the first reference signal.

* * * * *